United States Patent
Markovski

(10) Patent No.: US 11,781,578 B2
(45) Date of Patent: Oct. 10, 2023

(54) JOINING SYSTEM FOR FURNITURE PARTS

(71) Applicant: VILOX AB, Helsingborg (SE)

(72) Inventor: Bobby Markovski, Helsingborg (SE)

(73) Assignee: VILOX AB, Helsingborg (SE)

( * ) Notice: Subject to any disclaimer, the term of this patent is extended or adjusted under 35 U.S.C. 154(b) by 182 days.

(21) Appl. No.: 17/424,360

(22) PCT Filed: Jan. 24, 2020

(86) PCT No.: PCT/EP2020/051786
§ 371 (c)(1),
(2) Date: Jul. 20, 2021

(87) PCT Pub. No.: WO2020/156954
PCT Pub. Date: Aug. 6, 2020

(65) Prior Publication Data
US 2022/0112912 A1     Apr. 14, 2022

(30) Foreign Application Priority Data

Jan. 29, 2019  (SE) .................................... 1950098-2
Jan. 29, 2019  (SE) .................................... 1950099-0

(51) Int. Cl.
*F16B 12/26*   (2006.01)
*F16B 12/12*   (2006.01)
(Continued)

(52) U.S. Cl.
CPC ............ *F16B 12/26* (2013.01); *F16B 12/125* (2013.01); *F16B 12/46* (2013.01); *F16B 2012/446* (2013.01); *F16B 2012/466* (2013.01)

(58) Field of Classification Search
CPC .......... A47B 47/042; A47B 2230/0074; A47B 2230/0081; A47B 2096/207;
(Continued)

(56) References Cited

U.S. PATENT DOCUMENTS

| 6,647,689 B2 * | 11/2003 | Pletzer .................... E04F 15/04 |
| | | 52/592.4 |
| 6,769,369 B1 * | 8/2004 | Brandenberg ........... A47B 3/06 |
| | | 312/257.1 |

(Continued)

FOREIGN PATENT DOCUMENTS

| CN | 1451072 A | 10/2003 |
| DE | 10156775 A1 * | 6/2003 .............. E04F 15/02 |

(Continued)

OTHER PUBLICATIONS

PCT; App No. PCT/EP2020/051786; International Search Report and Written Opinion dated Feb. 20, 2020.

(Continued)

*Primary Examiner* — Jonathan P Masinick
(74) *Attorney, Agent, or Firm* — Fitch, Even, Tabin & Flannery, LLP

(57) ABSTRACT

In as first aspect of the invention, this is achieved by a joining system for furniture parts comprising female coupling recess formed in a first furniture part, a male coupling tongue projecting from an adjoining second furniture part, said female coupling recess being adapted to receive the male coupling tongue, said male coupling tongue comprising a first locking element configured for a snap joint interlocking engagement with a matching second locking element in said female coupling recess, the male coupling tongue being configured to be more flexible than the female coupling recess. The joining system comprises an upper guiding surface arranged on a first side of the female coupling recess on the first furniture part, forming an essentially non-resilient guide for the male coupling tongue upon insertion thereof, limiting movement of said male coupling tongue in a direction
towards said first side of the female coupling recess. The joining system comprises a lower guiding surface arranged (Continued)

on a second side of the female coupling recess on the first furniture part, located opposite to said first side thereof, said lower guiding surface is configured to force the male coupling tongue to resiliently deflect whilst in engagement with said upper guiding surface upon further insertion thereof in a deflection movement towards said first side of the female coupling recess, until the first locking element of the male coupling tongue snaps together with the matching second locking element of the female coupling recess.

20 Claims, 25 Drawing Sheets

(51) Int. Cl.
*F16B 12/46* (2006.01)
*F16B 12/44* (2006.01)

(58) Field of Classification Search
CPC .......... F16B 2012/446; F16B 2012/463; F16B 2012/466; F16B 5/0012; F16B 5/0016; F16B 12/12; F16B 12/125; F16B 12/26; F16B 12/44; F16B 12/46
See application file for complete search history.

(56) References Cited

U.S. PATENT DOCUMENTS

| | | | | |
|---|---|---|---|---|
| 7,150,135 | B2* | 12/2006 | Becker | F16B 5/0044 52/592.4 |
| 7,654,055 | B2* | 2/2010 | Ricker | A47B 47/0075 52/592.1 |
| 8,220,398 | B1* | 7/2012 | Brandenberg | A47B 3/06 312/111 |
| 8,590,976 | B2* | 11/2013 | Davis | A47C 4/021 297/440.13 |
| 9,121,181 | B2* | 9/2015 | Hamberger | F16B 5/0016 |
| 9,714,672 | B2 | 7/2017 | Derelöv | |
| 10,731,689 | B2* | 8/2020 | Maertens | A47B 96/201 |
| 10,736,416 | B2* | 8/2020 | Derelöv | A47B 47/042 |
| 2001/0034992 | A1* | 11/2001 | Pletzer | E04F 15/04 52/592.1 |
| 2002/0069611 | A1* | 6/2002 | Leopolder | E04F 15/02 52/590.3 |
| 2002/0083673 | A1 | 7/2002 | Kettler | |
| 2002/0170258 | A1 | 11/2002 | Schwitte | |
| 2005/0028474 | A1* | 2/2005 | Kim | E04F 15/04 52/578 |
| 2013/0071172 | A1* | 3/2013 | Maertens | F16B 5/0016 403/376 |
| 2013/0287484 | A1* | 10/2013 | Phillips | A47B 47/042 403/298 |
| 2015/0000222 | A1 | 1/2015 | Devos et al. | |
| 2015/0196118 | A1 | 7/2015 | Derelov | |
| 2015/0230600 | A1* | 8/2015 | Schulte | F16B 12/26 312/265.5 |
| 2016/0000220 | A1* | 1/2016 | Devos | F16B 12/46 403/363 |
| 2016/0340913 | A1 | 11/2016 | Derelov | |
| 2017/0227032 | A1 | 8/2017 | Fridlund | |
| 2017/0328395 | A1 | 11/2017 | Cappelle et al. | |
| 2018/0202160 | A1 | 7/2018 | Derelov | |

FOREIGN PATENT DOCUMENTS

| | | | | |
|---|---|---|---|---|
| DE | 102005044462 | A1 * | 3/2007 | ............. C09J 11/06 |
| DE | 202009008825 | U1 | 10/2009 | |
| DE | 202014100089 | U1 | 4/2015 | |
| DE | 102014110123 | A1 * | 1/2016 | ............. F16B 12/26 |
| EA | 031386 | B1 | 12/2018 | |
| EP | 1261785 | B1 | 7/2003 | |
| EP | 3150083 | B1 * | 11/2017 | ............. F16B 12/24 |
| FR | 1374952 | A * | 11/2001 | |
| FR | 2808824 | A1 * | 11/2001 | ......... E04F 13/0878 |
| RU | 2585712 | C2 | 6/2016 | |
| WO | 2010070472 | A2 | 6/2010 | |
| WO | 2015038059 | A1 | 3/2015 | |
| WO | 2016059549 | A2 | 4/2016 | |
| WO | WO-2019038268 | A1 * | 2/2019 | ............... E04B 1/14 |

OTHER PUBLICATIONS

PCT; App No. PCT/EP2020/051786; International Preliminary Report on Patentability dated Jun. 16, 2021.
PCT; App No. PCT/EP2020/051786; Written Opinion of the International Preliminary Examining Authority dated Jan. 11, 2021.
CNIPA; Office Action dated Jun. 15, 2022; Chinese Patent Application No. 202080010285.0 (10 pages).
PRV; App. No. 1950099-0; Swedish Search Report dated Jul. 25, 2019.
PRV; App. No. 1950098-2; Swedish Search Report dated Jul. 25, 2019.
Search Report from Russian Application No. 2021118249/28(038392); dated May 23, 2023 with English Machine Translation (4 Pages).
Office Action from Russian Application No. 2021118249/28(038392); dated May 25, 2023 with English Machine Translation (12 Pages).
Office Action from European Application No. 20 702 107.2-1015; dated Aug. 23, 2023 (6 Pages).

* cited by examiner

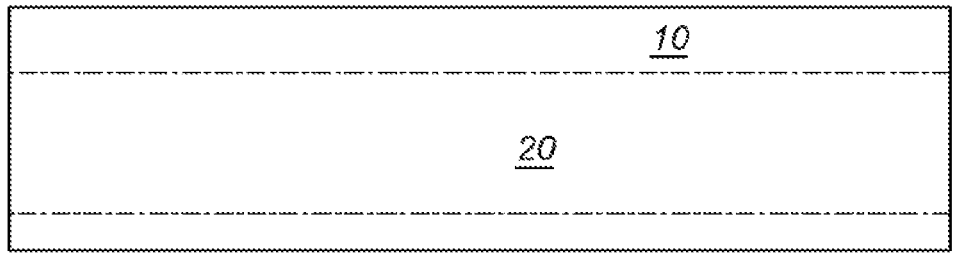
*Fig. 29*
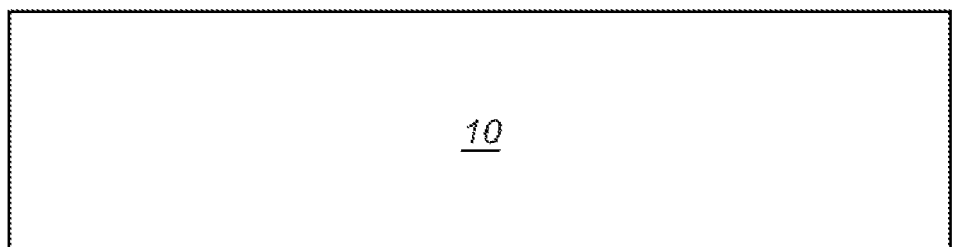
*Fig. 30*
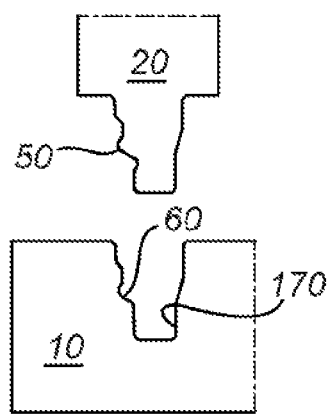     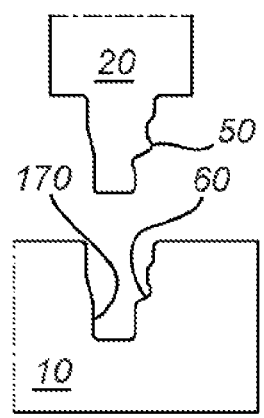
*Fig. 31*     *Fig. 32*

JOINING SYSTEM FOR FURNITURE PARTS

CROSS-REFERENCE TO RELATED APPLICATIONS

This application is a U.S. national phase application of International Application No. PCT/EP2020/051786, filed Jan. 24, 2020, which claims priority to Swedish Patent Application No. 1950098-2, filed Jan. 29, 2019, and to Swedish Patent Application No. 1950099-0, filed Jan. 29, 2019.

TECHNICAL FIELD

The invention relates to a joining system for furniture parts, comprising a female coupling recess formed in a first furniture part. The female coupling recess is adapted to receive a male coupling tongue projecting from an adjoining second furniture part.

BACKGROUND

In the recent years the furniture industry is gradually replacing traditional fastening and joining methods using nails and screw and nut joining elements with various snap-locking joining systems.

This trend vastly facilitates installation of furniture such as for example book shelves, wardrobes and cupboards. An example of such a joining system is described in U.S. Pat. No. 9,714,672 (B2) where a set of panels includes a first panel having a first main plane and a second panel having a second main plane. The panels are provided with a mechanical locking device for locking a first edge of the first panel to a second edge of the second panel. The mechanical locking device includes an edge section groove at the first edge, wherein an edge section of the second edge is insertable into the edge section groove. A flexible tongue is pre-fitted in an insertion groove provided in the edge section groove and cooperates with a tongue groove provided at the edge section of the second panel. The complexity of the joining systems in the prior art is a problem that entails complicated and expensive manufacturing processes. A further problem with the prior art systems is lack of stability in certain load direction. In some cases the lack of structural symmetry, results in insufficient side stability, or bending resistance. Stability may be sufficient when subjected to a force in one direction. If subjected to a force in another direction, normally the opposite direction, the prior art joining systems may be weaker and eventually flex, deflect or bend in an undesired way. These uneven stability properties of the joints have to be taken into account when designing a piece of furniture, which potentially limits available design options in the design process.

SUMMARY

It is an object of the invention to at least partly overcome one or more limitations of the prior art. In particular, it is an object to provide and improved joining system for furniture parts which is less complex to manufacture and which is more robust with an increased multi-directional side stability compared to existing joining systems.

In as first aspect of the invention, this is achieved by a joining system for furniture parts comprising female coupling recess formed in a first furniture part, a male coupling tongue projecting from an adjoining second furniture part, said female coupling recess being adapted to receive the male coupling tongue, said male coupling tongue comprising a first locking element configured for a snap joint interlocking engagement with a matching second locking element in said female coupling recess, the male coupling tongue being configured to be more flexible than the female coupling recess. The joining system comprises an upper guiding surface arranged on a first side of the female coupling recess on the first furniture part, forming an essentially non-resilient guide for the male coupling tongue upon insertion thereof, limiting movement of said male coupling tongue in a direction towards said first side of the female coupling recess. The joining system comprises a lower guiding surface arranged on a second side of the female coupling recess on the first furniture part, located opposite to said first side thereof, said lower guiding surface is configured to force the male coupling tongue to resiliently deflect whilst in engagement with said upper guiding surface upon further insertion thereof in a deflection movement towards said first side of the female coupling recess, until the first locking element of the male coupling tongue snaps together with the matching second locking element of the female coupling recess. The lower guiding surface at its lowest end transitions into a lateral locking surface extending essentially parallelly to a longitudinal direction of the female coupling recess, said lateral locking surface is configured to exert a horizontal pressure on the male coupling tongue towards said first side of the female coupling recess, holding the first and second locking elements of the male coupling tongue and the female coupling recess in engagement with each other in a joined state between the first furniture part and the second furniture part.

Having a lower guiding surface configured to force the male coupling tongue to resiliently deflect whilst in engagement with said upper guiding surface upon further insertion thereof in a deflection movement towards said first side of the female coupling recess, until the first locking element of the male coupling tongue snaps together with the matching second locking element of the female coupling recess, provides for a robust joining system with an increased multi-directional side stability, while being less complex to manufacture.

It is a further object of the invention to at least partly overcome one or more limitations of the prior art. In particular, it is an object to provide and improved joining system for furniture parts which is less complex to manufacture and more robust, while being easy to assemble and disassemble if desired.

In one aspect of the invention, this is achieved by a joining system for furniture parts, comprising a female coupling recess formed in a first furniture part, and a male coupling tongue projecting from an adjoining second furniture part. The female coupling recess is adapted to receive the male coupling tongue, and the male coupling tongue comprises a first locking element configured for a snap joint interlocking engagement with a matching second locking element in said female coupling recess. The first locking element comprises a flexible locking protrusion integrally formed in the male coupling tongue and extends laterally from the male coupling tongue. The second locking element in said female coupling recess comprises a locking groove to receive the flexible locking protrusion for said interlocking engagement. The female coupling recess comprises a coupling release channel with an open end facing the flexible locking protrusion of the male coupling tongue when locked in the female coupling recess. The coupling release channel is adapted for receiving a coupling release rod to engage with the flexible locking protrusion and force the flexible locking protrusion to flex out of its engagement with the locking groove in the female coupling recess so as to deliberately separate the first furniture part from the second furniture part.

In a further aspect of the invention, this is achieved by a method for unlocking a joining system for furniture parts. The method comprises unlocking the joining system according to the first aspect by inserting a coupling release rod into the coupling release channel, thus forcing the flexible locking protrusion to flex out of its engagement with the locking groove in the female coupling recess for deliberately separating the first furniture part from the second furniture part.

Having a flexible locking protrusion integrally formed in the male coupling tongue and a female coupling recess comprising a locking groove to receive the flexible locking protrusion, as well as a coupling release channel with an open end facing the flexible locking protrusion, provides for a joining system which is less complex to manufacture and which is robust but yet allows for easy disassembly if desired.

The coupling release channel may be inclined relative to a longitudinal direction of the female coupling recess. The coupling release channel may be inclined relative to a longitudinal direction of the female coupling recess with an inclination angle within an interval of 130 to 160 degrees, and advantageously within an interval of 136 to 146 degrees. In another advantageous example the inclination angle of the coupling release channel is essentially 141 degrees.

The flexible locking protrusion may be inclined relative to a longitudinal direction of the male coupling tongue. The flexible locking protrusion may be inclined relative to a longitudinal direction of the male coupling tongue with an inclination angle within an advantageous interval of 40 to 73 degrees. In another advantageous example the inclination angle of the flexible locking protrusion may be essentially 64 degrees.

The coupling release rod may comprise a generally rectangular cross-section. Alternatively, the coupling release rod comprises a generally I-beam shaped cross-section, with a central waist portion located between two laterally extending end portions.

The coupling release rod may be at least partly tapered having an increasing cross-sectional area from, or at a distance from, a tip portion thereof towards a base portion thereof. The coupling release rod may comprise an introductory section with a constant cross-sectional area, extending from said tip portion to a tapered unlocking section with an increasing cross-sectional area towards the base portion of said coupling release rod.

The length of the tapered unlocking section may exceed the length of the introductory section. The length of the introductory section may be from 30% to 50% of the length of the tapered unlocking section. The length of the introductory section may be 40% of the length of the tapered unlocking section.

In one example, the tapered unlocking section comprises a linear tapering profile. In another example, the tapered unlocking section comprises a non-linear tapering profile. In such an embodiment, the tapered unlocking section may comprise a concave tapering profile. The tapered unlocking section may comprise a convex tapering profile.

A longitudinal axis of the coupling release channel and a longitudinal axis of the flexible locking protrusion intersect at a first intersection angle when the flexible locking protrusion of the male coupling tongue is seated in the locking groove of the female coupling recess, and that said intersection angle is increased to a second intersection angle when the coupling release rod is introduced into the coupling release channel to a point of release between said flexible locking protrusion and the locking groove of the female coupling recess, whereby the flexible locking protrusion is deflected out of engagement with the locking groove by the tapered coupling release rod. The first intersection angle may be less than 90 degrees, and the second intersection angle may be essentially 90 degrees. The flexible locking protrusion may be essentially perpendicular to the coupling release channel when the coupling release rod is inserted to a point of release of said coupling protrusion as it leaves the locking groove in the female coupling recess.

The coupling release rod may comprise a manipulation handle at its base portion. The coupling release rod may be made of a polymer material and/or metal.

The flexible locking protrusion may exhibit a curved bulb-shaped tip portion adapted to engage a matching curved portion of said locking groove in the female coupling recess. The curved bulb-shaped tip portion of the flexible locking protrusion is shaped to engage the curved portion of said locking groove in the female coupling recess along a partial segment of said tip portion defined by a limited segment angle uniformly straddling a longitudinal symmetry axis of the flexible locking protrusion.

The lateral extension of the base portion of the male coupling tongue relative to a longitudinal axis of said male coupling tongue may exceed the lateral extension of the of flexible locking protrusion relative to said longitudinal axis of said male coupling tongue.

A slot may be located between the flexible locking protrusion and the base portion of the male coupling tongue. This slot is adapted to leave room for the flexible locking protrusion to deflect in the direction of said base portion when a coupling release rod is received in the coupling release channel.

The slot may extend essentially in parallel with the flexible coupling release protrusion.

The method for unlocking the joining system may comprise angling the second furniture part relative to the first furniture part, or vice versa, following initial unlocking of a first stretch of a furniture joint, said angling resulting in progressive unlocking of a remaining stretch of said furniture joint.

Furthermore, the method may comprise unlocking two furniture joints located at a distance from each other in a common furniture part and two other corresponding furniture parts by simultaneously inserting a coupling release rod into the coupling release channels of each furniture joint.

Still other objectives, features, aspects and advantages of the invention will appear from the detailed description as well as from the drawings.

BRIEF DESCRIPTION OF THE DRAWINGS

Embodiments of the invention will now be described, by way of example, with reference to the accompanying schematic drawings.

FIG. 29 shows a plain view from above of the joining system of the embodiment described with reference 2.

FIG. 30 shows a plain view from below of the joining system of the embodiment described with reference 2.

FIG. 31 shows a plain view from the front of the joining system of the embodiment described with reference 2.

FIG. 32 shows a plain view from the rear of the joining system of the embodiment described with reference 2.

DETAILED DESCRIPTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

Figure 1:
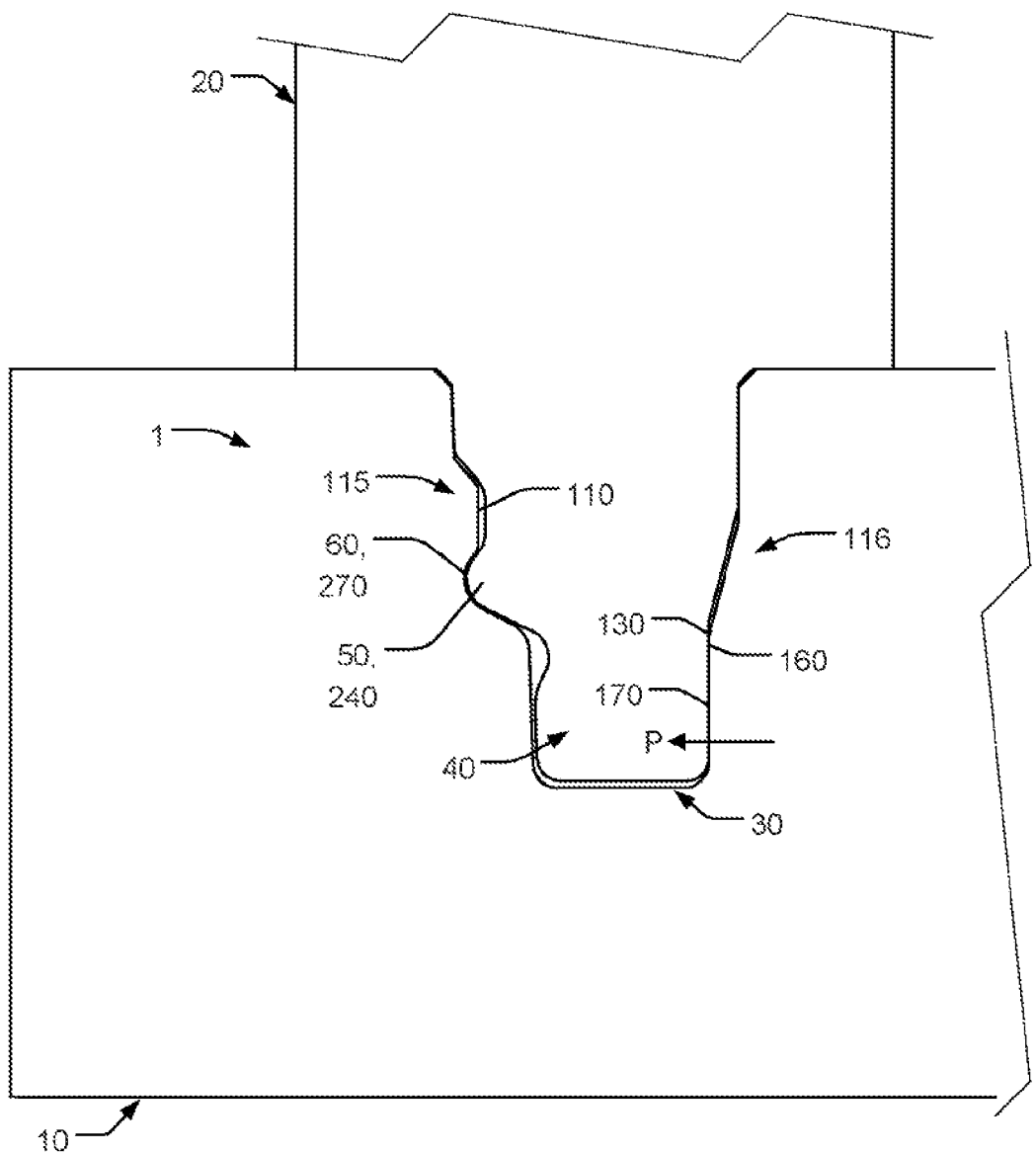
FIG. 1 shows a side view of a joining system according to an example of the disclosure, applied on an exemplifying basic furniture 90 degree corner joint between two furniture parts. The figure shows the joining system in a fully joined and locked position, wherein a male coupling tongue extending from one of the furniture parts is engaged in a female coupling recess formed in the other furniture part.

FIG. 1 is a schematic illustration of a joining system 1 for furniture parts 10, 20. The joining system 1 comprises a female coupling recess 30 formed in a first furniture part 10, and a male coupling tongue 40 projecting from an adjoining second furniture part 20. The female coupling recess 30 is adapted to receive the male coupling tongue 40, and the male coupling tongue 40 comprises a first locking element 50 configured for a snap joint interlocking engagement with a matching second locking element 60 in the female coupling recess 30. The male coupling tongue 40 is configured to be more flexible than the female coupling recess 30.

Figure 3:
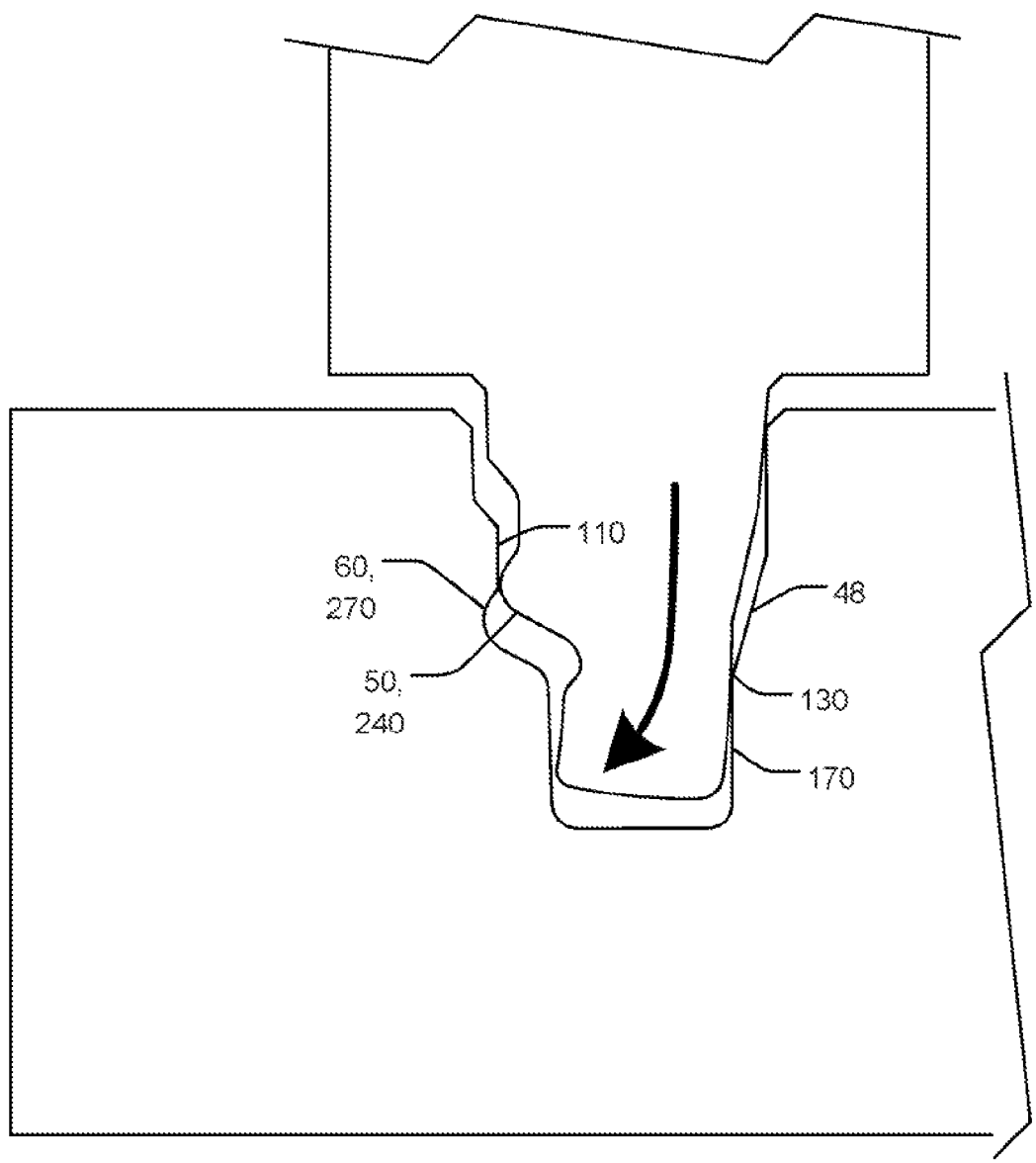
FIG. 3 shows a further side view of the joining system in an intermediate insertion position, wherein the male coupling tongue is resiliently deflected to the left in the figure, immediately before finally snapping into the final locked position as shown in FIG. 1.

The material surrounding the female coupling recess 30 is thus more rigid than the male coupling tongue 40. The male coupling tongue 40 may be configured to be essentially resilient whereas the female coupling recess 30 is configured to be essentially rigid and non-resilient. An upper guiding surface 110 is arranged on a first side 115 of the female coupling recess 30 on the 5 first furniture part 10. The upper guiding surface 110 forms an essentially rigid or non-resilient guide for the male coupling tongue 40 upon insertion thereof, limiting movement of the male coupling tongue 40 in a direction towards the first side 115 of the female coupling recess 30. The joining system 1 comprises a lower guiding surface 130 arranged on a second side 116 of the female coupling recess 30 on the first furniture part 10, located opposite to said first side 115 thereof. The lower guiding surface 130 is configured to force the male coupling tongue 40 to resiliently deflect whilst in engagement with the upper guiding surface 110 upon further insertion thereof in a deflection movement, as schematically illustrated in FIG. 3. The male coupling tongue 40 is deflected towards the first side 115 of the female coupling recess 30, until the first locking element 50 of the male coupling tongue 40 snaps together with the matching second locking element 60 of the female coupling recess 30, i.e. to assume the joined state shown in FIG. 1. The first locking element 60 may comprise an integral protrusion 60 integrally formed in the male coupling tongue 40. The protrusion 60 may extend in a direction essentially perpendicular to a longitudinal direction 245 in which the male coupling tongue 40 extends. The second locking element 60 may comprise a recess 60 for receiving the protrusion 60.

The lower guiding surface 130 at its lowest end 160 transitions into a lateral locking surface 170 extending essentially parallelly to a longitudinal direction of the female coupling recess 30. The lateral locking surface 170 is configured to exert a horizontal pressure (P) on the male coupling tongue 40 towards the first side 115 of the female coupling recess 30, as schematically illustrated in FIG. 1. The horizontal pressure (P) holds the first and second locking elements 50, 60 of the male coupling tongue 40 and the female coupling recess 30 in engagement with each other in a joined state between the first furniture part 10 and the second furniture part 20. The first and second furniture parts 10, 20, may thus be joined at a 90 degree angle as illustrated in e.g. FIG. 1. It should be understood that the first and second furniture parts 10, 20, may be joined at different angles, i.e. oblique or acute angles, besides from the perpendicular angle as illustrated in the example of FIG. 1.

Having a lower guiding surface 130 configured to force the male coupling tongue 40 to resiliently deflect whilst in engagement with the upper guiding surface 110 upon further insertion of the male coupling tongue 40 in a deflection movement towards the first side 115 of the female coupling recess 30, until the first locking element 50 snaps together with the matching second locking element 60, provides for a robust joining system 1 with an increased multi-directional side stability, while being less complex to manufacture. A further increased stability and increased strength in the interlocked state of the first and second furniture parts 10, 20, is provided for when having the first locking element 60 comprising an integral protrusion 60 integrally formed in the male coupling tongue 40. E.g. a drawback of prior art joining system is that a separate flexible polymer tongue is typically required for the interlocking of the furniture parts, which has to be pre-fitted during manufacture. This may increase the complexity of the production line and manufacturing process as well as the joining system as such becomes more expensive. The throughput of the production line in mass production may also be more limited. Thus, in addition to providing for a more robust and stronger joining system 1 which can absorb greater force loads in more directions—due to its single-piece integrated construction—the manufacturing thereof is also facilitated. The furniture parts 10, 20, may correspond to various parts of pieces of different furniture items to be assembled together utilizing the joining system 1, such as drawers, wardrobes, shelves, desks, cabinets, etc.

Figure 2:
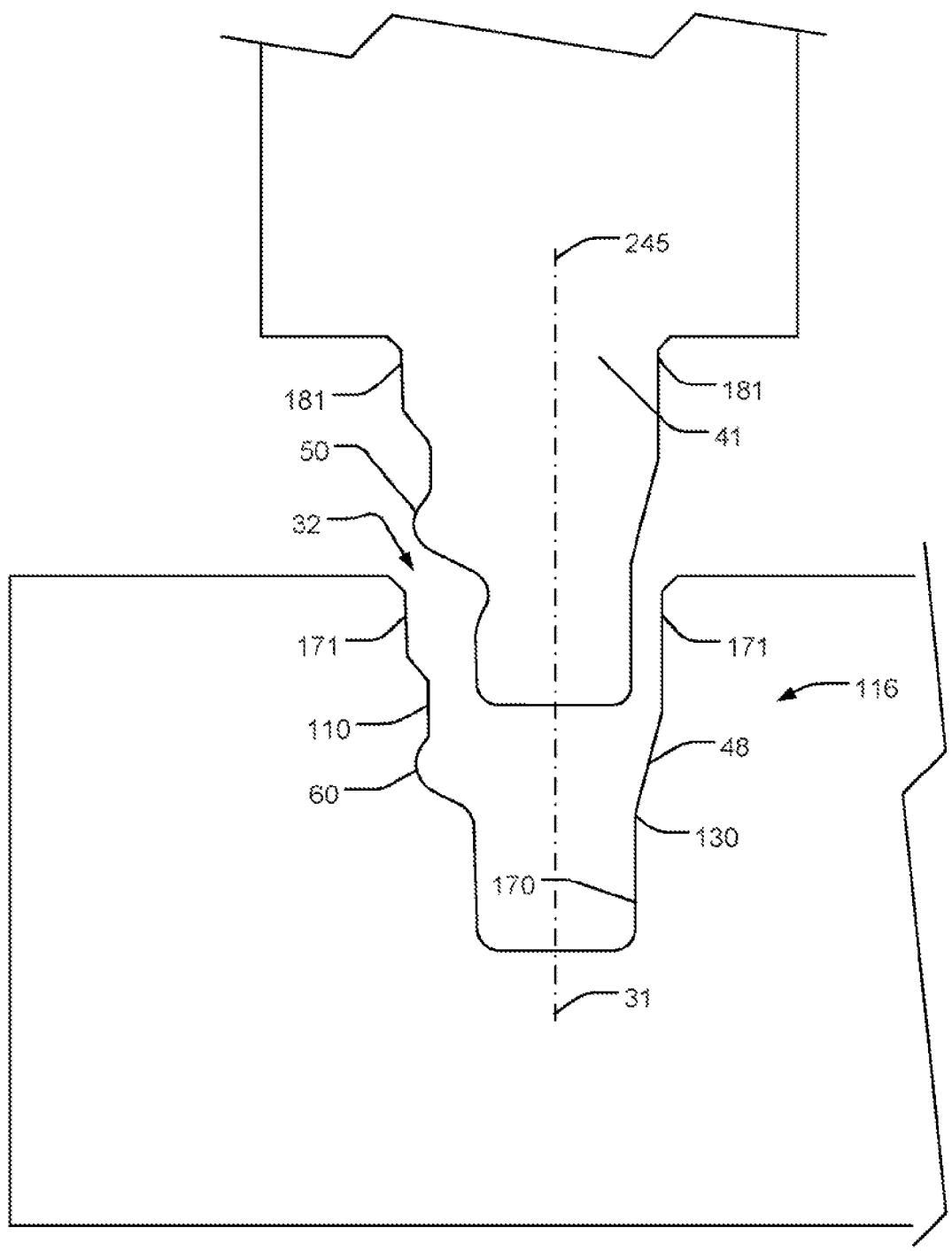
FIG. 2 shows a side view similar to the one in FIG. 1, only here in a position before the male coupling tongue of the second furniture part has engaged the female coupling recess of the first furniture part.

The lower guiding surface 130 may be arranged at an apex formed at the joining edge of the lateral locking surface 170 and an inclined surface 48 at the second side 116 of the female coupling recess 30, as illustrated in FIG. 2. At least part of the aforementioned inclined surface 48 may form the lower guiding surface 130. E.g. as the male coupling tongue 40 is inserted into the female coupling recess 30, a lower portion of the male coupling tongue 40 may be initially guided by the inclined surface 48 to the position shown in FIG. 5. As a force is applied on the male coupling tongue 40 for continued insertion thereof, the reaction force towards the male coupling tongue 40 for deflection thereof becomes more concentrated to the apex of the lateral locking surface 170 and the inclined surface 48, i.e. where the guiding surface 130 is indicated in FIG. 3.

The lower guiding surface 130 may be configured to force the male coupling tongue 40 to resiliently deflect whilst in engagement with said upper guiding surface 110 upon further insertion thereof in a curved J-shaped deflection movement towards said first side 115 of the female coupling recess 30, until the first locking element 50 of the male coupling tongue 40 snaps together with the matching second locking element 60 of the female coupling recess 30. Such deflection movement is illustrated in the schematic example of FIG. 3. A facilitated insertion of the male coupling tongue 40 into the interlocked position may thus be provided, while achieving a robust and stable interlocked state.

The first locking element 50 may comprise a continuously curved bulb-shaped protrusion 240 extending from the male coupling tongue 40, as illustrated in e.g.

FIG. 3. This provides for an improved structural integrity with a reduced risk of unwanted deformations, while a facilitated manufacturing of the first locking element 50 may be provided.

The second locking element 60 may comprise a concave locking groove 270 conforming at least partly to the bulb-shaped protrusion 240 for interlocking engagement therewith, as illustrated in FIG. 1. The bulb-shaped protrusion 240 may thus smoothly engage with the concave locking groove 270 while maximizing the area of contact between the two, allowing for reducing localized points of increased pressure if a load is applied onto the first or second furniture part 10, 20.

The upper guiding surface 110 may extend essentially in parallel with a longitudinal direction 31 of the female coupling recess 30, as schematically illustrated in FIG. 2. The upper guiding surface 110 may extend directly from the second locking element 60 of the female coupling recess 30 in a direction towards an insertion opening 32 of said female coupling recess 30. Such arrangement of the upper guide surface 110 provides for an effective and reliable guiding of the first locking element 50 into the correct interlocking position in the adjacent second locking element 60 along the longitudinal direction 31.

The lower guiding surface 130 may be curved. Having a curved guiding surface 130 provides for a facilitated guiding of the male coupling tongue 40 into the final interlocked state in the female coupling recess 30, as the guiding surface 130 may exert a force in gradually changing directions against the male coupling tongue 40 for deflection thereof as described above, as the latter is pushed and advanced downwards into the final position. As elucidated above, the lower guiding surface 130 may form part of the inclined surface 48 and the lateral locking surface 170, effectively being combined to form a curved lower guiding surface 130. Although the example in FIG. 3 show a defined edge where guiding surface 130 reference numeral is indicated, it is conceivable that the inclined surface 48 and the lateral locking surface 170 forms a smoother transition.

Hence, the lower guiding surface 130 may be inclined relative to a longitudinal direction 31 of the female coupling recess 30. I.e. the lower guiding surface 130 may effectively be defined at least partly by the inclined surface 48 at the second side 116 of the female coupling recess 30 as shown in e.g. FIG. 2.

The male coupling tongue 40 may be integrally formed with the first furniture part 10 and the female coupling recess 30 may be integrally formed with the second furniture part 20. This provides for a robust joining system 1 which can absorb higher force loads, as well as a facilitated manufacturing of the joining system 1 with a reduced number of separate parts.

The male coupling tongue 40 may comprise side support surfaces 181 which may extend perpendicular from a base portion 41 of the male coupling tongue 40 on the second furniture part 20, as schematically illustrated in FIG. 2. The side support surfaces 181 are arranged for direct abutment against support surfaces 171 on the first furniture part 10. This provides for symmetrical side stability and bending resistance in a locked and joined state between the first furniture part 10 and the second furniture part 20.

Figure 4:
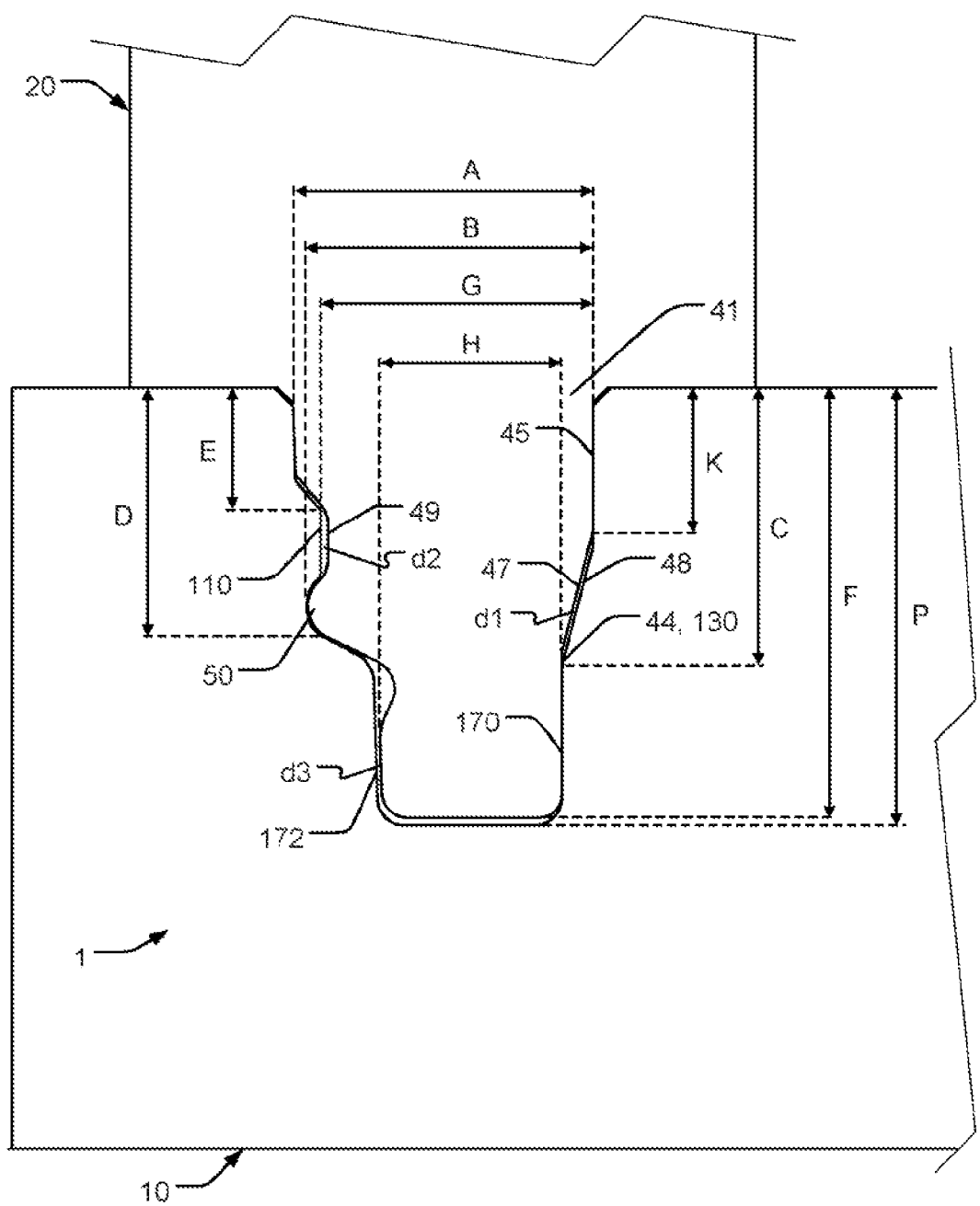
FIG. 4 shows a similar side view as in FIG. 1.

A width (A) at a base portion 41 of the male coupling tongue 40 may be wider than a width (B) of the male coupling tongue 40 at the first locking element 50 thereof, as illustrated in FIG. 4. Having a wider base portion 41 provides for a further increased side stability of the joining system 1. The width (B) may be wider than a width (G) of the female coupling recess 30 at the upper guiding surface 110, as illustrated in FIG. 4. This provides for an efficient and robust interlocking mechanism. The width (H) of the most distal part of the male coupling tongue 40, at the lateral locking surface 170, may be less than the widths A, B, and G. This provides for attaining a facilitated deflection of the distal part of the male coupling tongue 40, as illustrated in FIG. 3, while having a robust base portion 41 and a reliable interlocking mechanism.

Figure 5:
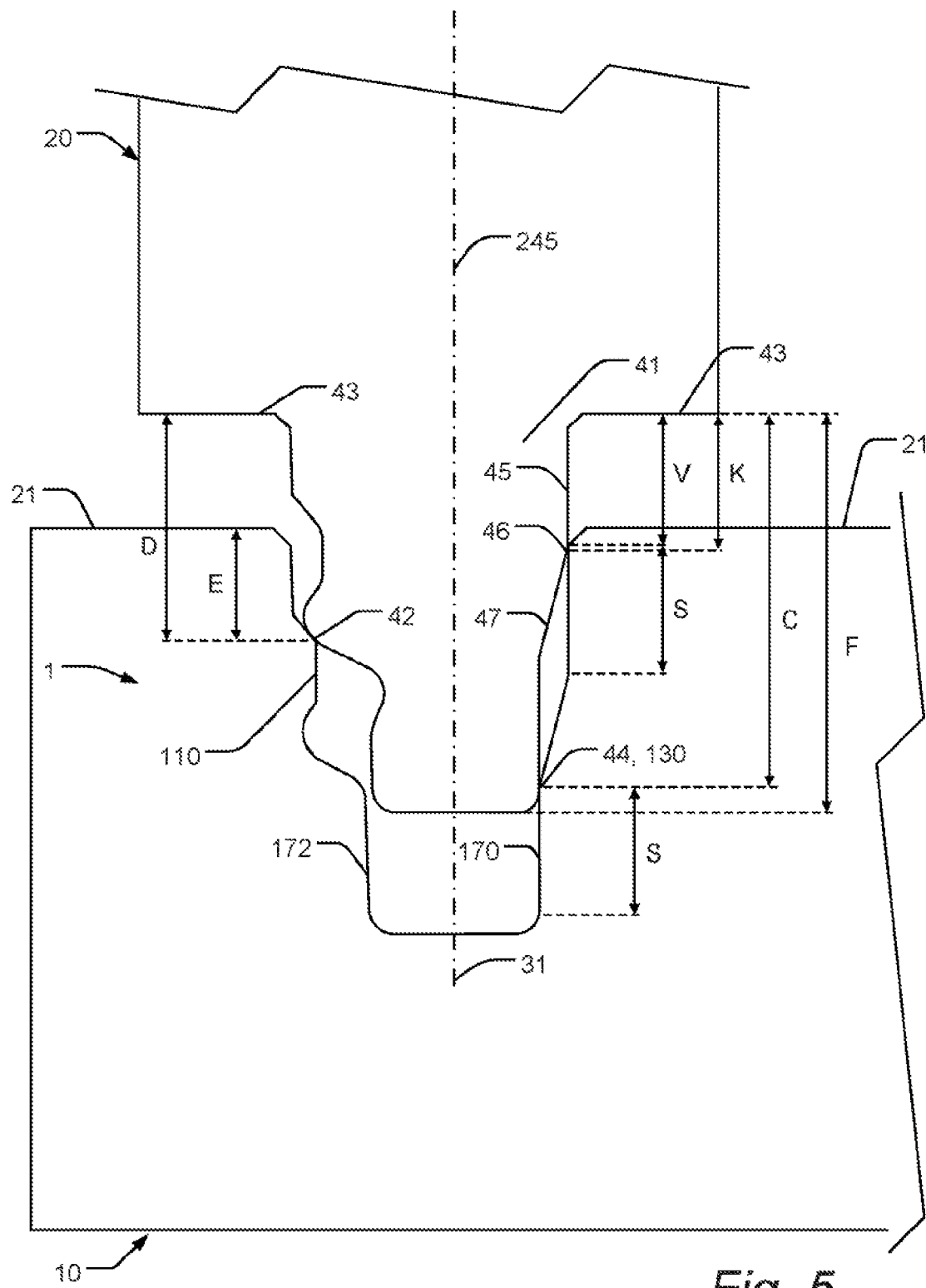
FIG. 5 shows a further side view of the joining system in an intermediate insertion position, wherein the male coupling tongue rests on an edge in the female coupling recess before further insertion.

The first locking element 50 may come to rest at an edge 42 of the upper guiding surface 110, as shown in FIG. 5, before the lower guiding surface 130 force the male coupling tongue 40 to resiliently deflect, upon insertion of the male coupling tongue 40 (FIG. 3). Turning again to FIG. 5, the male coupling tongue 40 extends from a base surface 43 of the second furniture part 20, where the base surface 43 extends perpendicular to a longitudinal direction 245 of the male coupling tongue 40. A length D extends from the base surface 43 to the aforementioned edge 42, as shown in FIG. 5. The lateral locking surface 170 is angled from the longitudinal direction 31 of the female coupling recess 30 at an upper edge 44. The upper edge 44 thus corresponds to the apex or tip where the lateral locking surface 170 joins or transitions into the inclined surface 48 of the second side of the female coupling recess 30, as illustrated in FIG. 4. A length C extends from the base surface 43 to said upper edge 44. In one example the length D is less than the length C.

In one example, when the first locking element 50 comes to rest at the edge 42 of the upper guiding surface 110, the length C may be less than the length F of the male coupling tongue 40 along a longitudinal direction 245 thereof, as illustrated in FIG. 5. Hence, when the first locking element 50 comes to rest at the edge 42 of the upper guiding surface 110, a portion of the male coupling tongue 40 have already been guided into position against the lateral locking surface 170. This provides for improved control of the position of the male coupling tongue 40 before being deflected towards the first side 115. This provides for a robust interlocking mechanism between the first and second furniture parts 10, 20. Having a length V being less than the length K as indicated in FIG. 5 also provides for such improved control of the position of the male coupling tongue 40 before being deflected towards the first side 115. The length V extends from the base surface 43 of the male coupling tongue 40 to the upper edge of the guide surface S of the female coupling recess. The length K extends from the base surface 43 to edge 46 of the male coupling tongue 40.

The length F of the male coupling tongue 40 along a longitudinal direction 245 thereof may be less than a depth P of the female coupling recess 30, as illustrated in the example of FIG. 4. This provides for avoiding unwanted tension between a tip portion of the male coupling tongue 40 and the base portion of the female coupling recess 30, as well as accommodating variations in manufacturing tolerances.

As mentioned, the first locking element 50 may come to rest at an edge 42 of the upper guiding surface 110 before the lower guiding surface 130 force the male coupling tongue 40 to resiliently deflect, upon insertion of the male coupling tongue 40. The female coupling recess 30 may be recessed from a base surface 21 of the first furniture part 10, where the base surface 21 extends perpendicular to a longitudinal direction 31 of the female coupling recess 30. A length E extends from the base surface 21 to said edge 42, as shown in FIG. 5. The male coupling tongue 40 may comprise a base portion 41 having a vertical surface 45 facing the second side 116 in the interlocked state. The vertical surface 45 may be essentially parallel with a longitudinal direction 245 of the male coupling tongue 40. The vertical surface 45 may transition to an inclined surface 47, with respect to the longitudinal direction 245, at an edge 46, as further shown in FIG. 5. As mentioned, the male coupling tongue 40 may further extend from a base surface 43 of the second furniture part 20, where the base surface 43 extends perpendicular to the longitudinal direction 245. A length K extends from the base surface 43 to the edge 46. The length E may be less than the length K.

The male coupling tongue 40 may comprise a base portion 41 having a vertical surface 45 facing the second side 116 in the interlocked state. The vertical surface 45 may be essentially parallel with a longitudinal direction 245 of the male coupling tongue 40. The lateral locking surface 170, and the first locking element 50, as well as the vertical surface 45 may be arranged to lock the male coupling tongue 40 in the horizontal direction, perpendicular to the longitudinal direction 245, as seen in FIG. 4. The lateral locking surface 170 faces an opposite second surface 172 of the female coupling recess 30, as shown in FIG. 5. The male coupling tongue 40 and the second surface 172 may be separated by a distance d3. This provides for accommodating tolerance variations, and preventing unwanted tension forces between male coupling tongue 40 and the female coupling recess 30.

The aforementioned vertical surface 45 of the male coupling tongue 40 may transition to an inclined surface 47, with respect to the longitudinal direction 245. The inclined surface 47 may face an opposite second inclined surface 48 of the female coupling recess 30 in the joined state, as shown in the example of FIG. 4. The second inclined surface 48 may transitions into the lateral locking surface 170. The inclined surface 47 and the second inclined surface 48 may be separated by a distance d1 in the joined state, as further illustrated in FIG. 4. This provides for avoiding unwanted tension between the male coupling tongue 40 and female coupling recess 30 in the joined state when a force vertical force is applied. The force may instead be concentrated to the horizontal base surfaces 21, 43, of the first and second furniture parts 10, 20. The base surfaces 21 on either side of the female coupling recess 30 may be arranged at the same height relative the female coupling recess 30, as illustrated in the example of e.g. FIG. 5. Such symmetry provides for a robust joining system 1 with an improved absorption of loads in multiple directions. In the latter example, the corresponding base surfaces 43 at either side of the male coupling tongue 40 are equally arranged at the same position along the longitudinal direction 245. However, it should be understood that in case the second furniture part 20 joins the first furniture part 10 at an angle different from 90 degrees, such as 70 degrees, 50 degrees, 45 degrees, 30 degrees etc, the base surfaces 43 may be correspondingly angled to accommodate such angular configuration.

The upper guiding surface 110 may face an opposite second surface 49 of the male coupling tongue 40 in the joined state. The guiding surface 110 and the second surface 49 may be separated by a distance d2 in the joined state, as shown in FIG. 4.

The surfaces of the second side 116 of the female coupling recess 30 indicated with S in FIG. 5 provide a counter force towards the male coupling tongue 40 when the latter slides against upper guiding surface 110, until reaching the interlocking engagement.

Figure 7A:
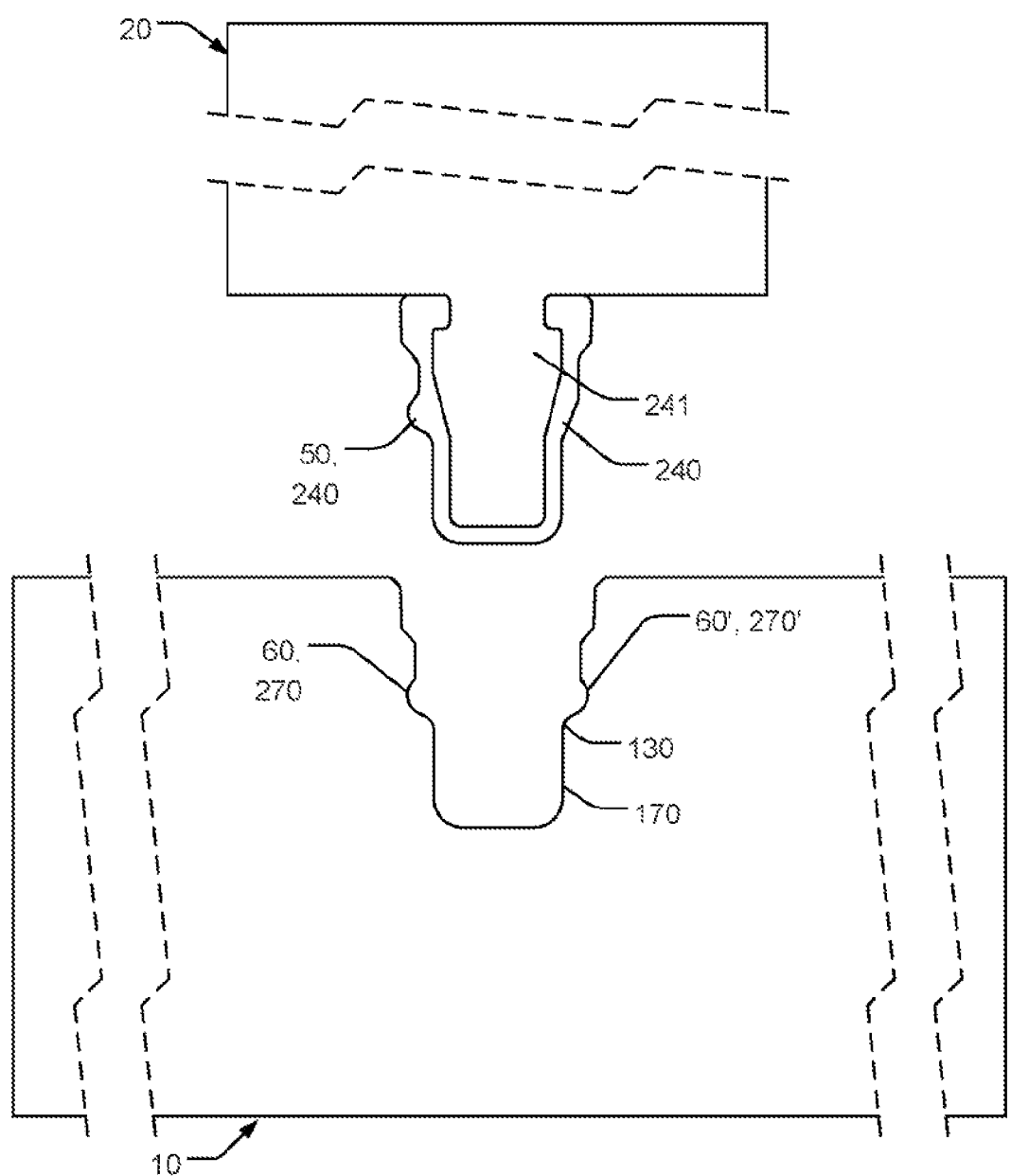
FIG. 7a shows a similar side view as in FIG. 2, albeit in an example where a detachable locking element is arranged on a core portion of the male coupling tongue.
Figure 7B:
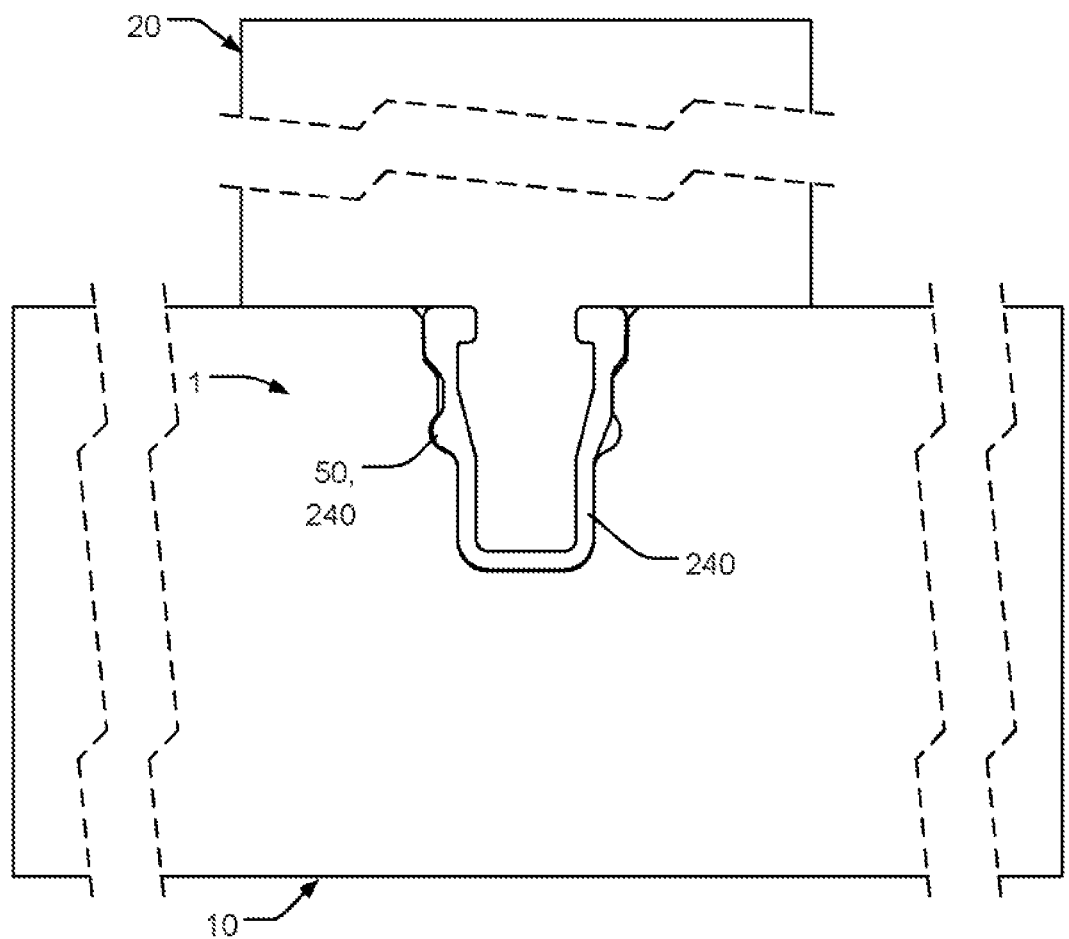
FIG. 7b shows a further side view where the male coupling tongue with its detachable locking element is arranged in an interlocked state with the female coupling recess.

The male coupling tongue 40 may comprise a removable locking element 240 defining an outer contour of the male coupling tongue 40, as schematically illustrated in the example of FIG. 7a. The locking element 240 is configured to be arranged within the female coupling recess 30, as shown in FIG. 7b. Thus, the removable locking element 240 comprises said first locking element 50 configured for a snap joint interlocking engagement with the matching second locking element 60 in the female coupling recess 30. Since the locking element 240 is removably attached it allows for facilitating different mounting options of the first and second furniture parts 10, 20. For example, the second furniture part 20 in FIG. 7c may be mounted in two different directions by turning the latter around the longitudinal direction 245 before the removable locking element 240 is attached to the male coupling tongue 40. The male coupling tongue 40, with the removable locking element 240 attached thereto, may then be joined with the female coupling recess 30. It should be understood that while the female coupling recess 30 in FIGS. 7a-c shows two opposite locking elements 60, 60', the dual mounting options as described above are realized with a female coupling recess 30 having only one locking element 60 due to the locking element 240 being removable as described.

The male coupling tongue 40 may comprise a core portion 241 positionable inside a cavity 242 of the removable locking element 240 in an interlocking position of respective mating surfaces 243, 244 so that the removable locking element 240 defines said outer contour of the male coupling tongue 40.

Figure 7C:
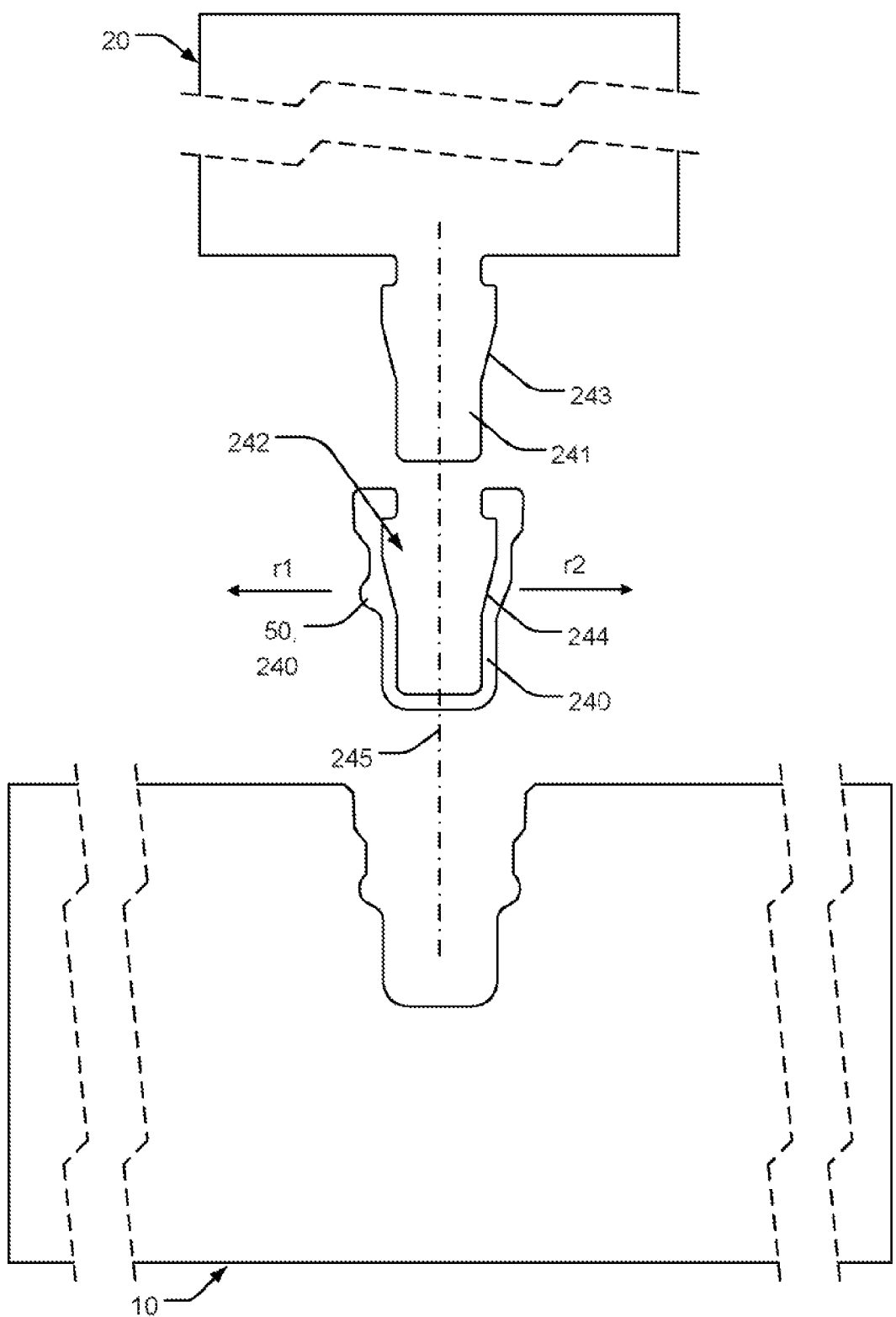
FIG. 7c shows a similar side view as in FIG. 7a but with the detachable locking element removed from the male coupling tongue.

The mating surfaces 243, 244, may be at least partly symmetrically aligned with respect to a longitudinal direction 245 of the male coupling tongue 40 so that the removable locking element 240 is positionable around the core portion in a first position, in which the first locking element 50 extends in a first radial direction r1, and in a second direction, in which the first locking element 50 extends in a second radial direction r2, opposite the first radial direction r1 as illustrated in FIG. 7c.

Analogously, the removable locking element 240 may be maintained in one direction, e.g. having the first locking element 50 facing the first radial direction r1, while the second furniture part 20 is flipped around the longitudinal axis 245, before the core portion 241 is positioned inside the cavity 242, due to the symmetrically aligned mating surfaces 243, 244.

The locking element 240, when in interlocking engagement with the matching second locking element 60 in the female coupling recess 30, may be arranged to prevent mutual separation of the furniture parts 10, 20 when subjected to a separation force applied between the first furniture part 10 and the second joining part 20. This thus prevents the male coupling tongue 40 from movement in a longitudinal direction of the male coupling tongue 40 with respect to the female coupling recess 30 in a locked and joined state between the first furniture part 10 and the second furniture part 20.

The locking element 240 may be generally U-shaped, as shown in the examples of FIGS. 7a-c. The locking element 240 may comprise a polymer material.

Figure 8A:
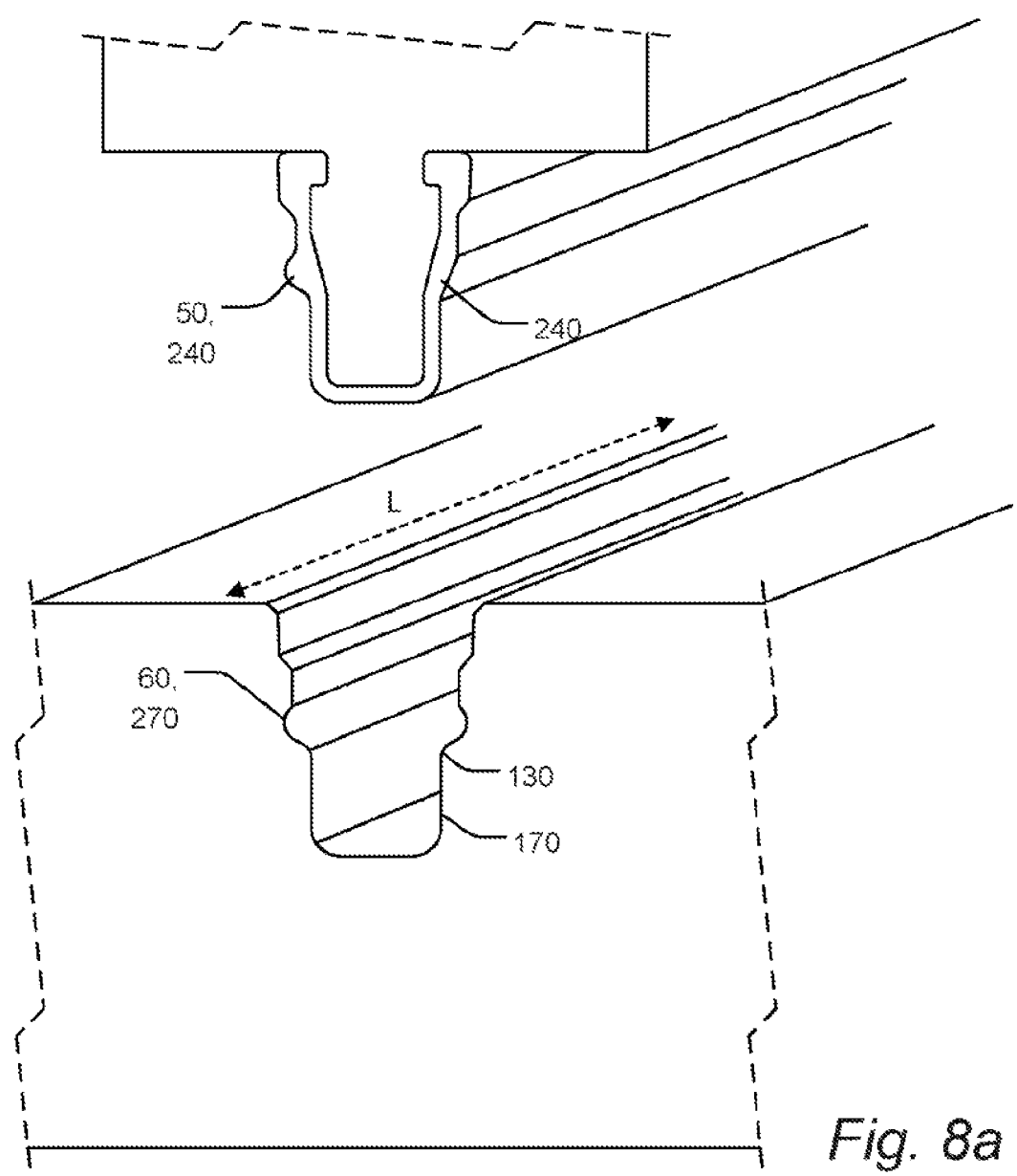
FIG. 8a shows a similar example as in FIG. 7a but in a perspective view.
Figure 8B:
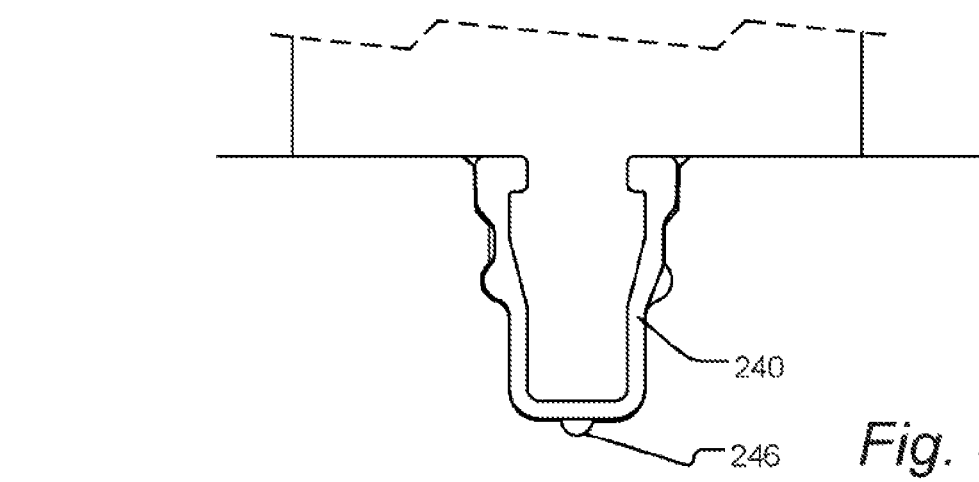
FIG. 8b shows a similar side view as in FIG. 7b but with a groove in a bottom portion of the female coupling recess.

The female coupling recess 30 may extend along a length L of the first furniture part 10, as shown in the perspective view of FIG. 8a. The locking element 240 may be slidable along the length L relative the male coupling tongue 40, when in the interlocking engagement, to be pushed out from the female coupling recess 30 and detached from the first and second furniture parts 10, 20. This allows for deliberate separation between the first furniture part 10 and the second furniture part 20 when detached. The female coupling recess 30 may comprise a groove 246 at a bottom part thereof, which provides for facilitating engagement with the locking element 240 with a tool to push the latter out from the female coupling recess 30.

Figure 9:
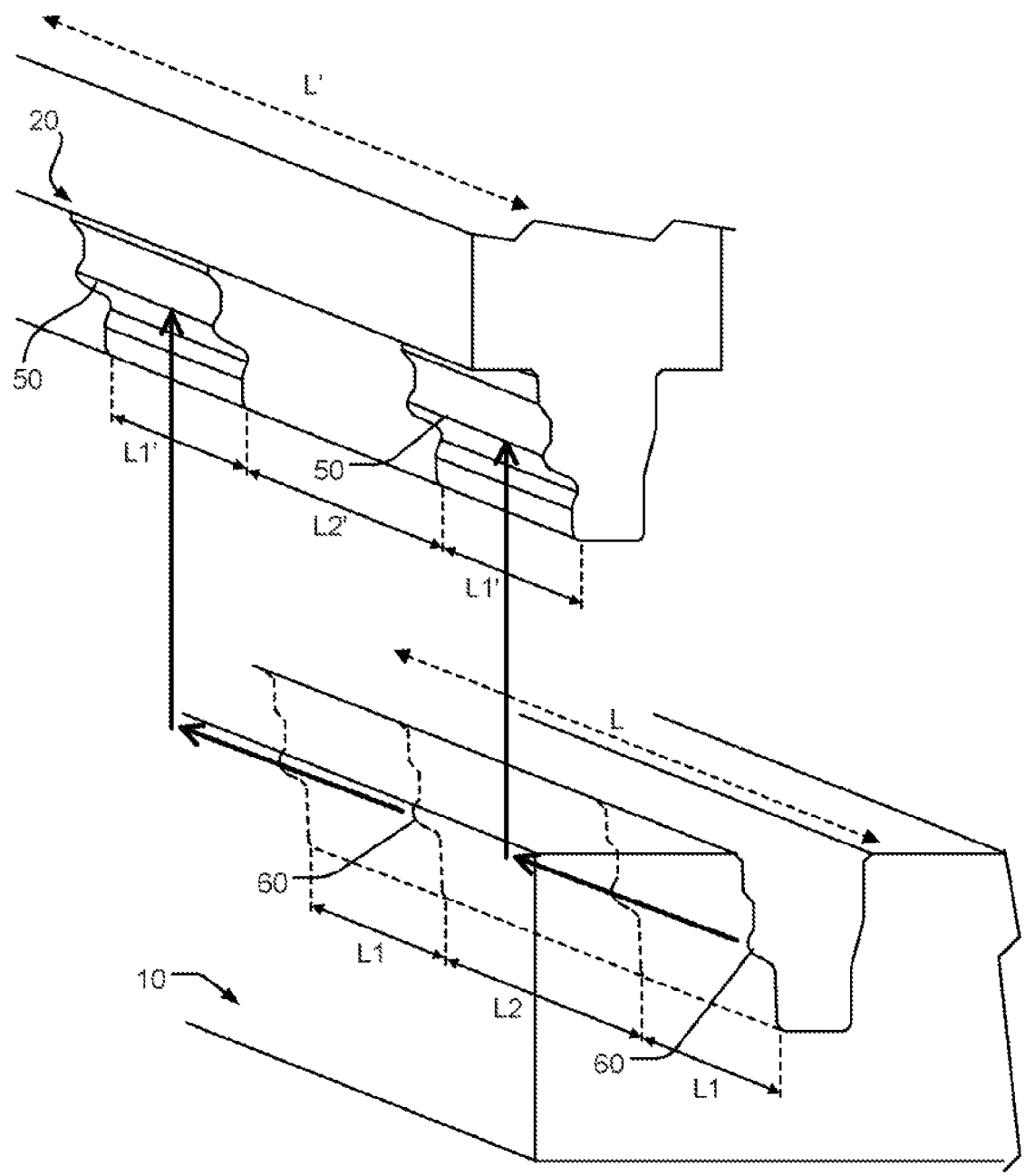
FIG. 9 shows a perspective view of the first and second furniture parts where detachment is accomplished by a sideways relative movement thereof.

The first locking element 50 may extend along intermittent lengths L1' of the male coupling tongue 40 along a length L' of the second furniture part 20, as shown in the schematic perspective view of FIG. 9. The intermittent lengths L1' may be are separated by male decoupling sections L2'. The second locking element 60 may extend along intermittent lengths L1 of the female coupling recess 30 along a length L of the first furniture part 10. The intermittent lengths L1' may be separated by female decoupling sections L2. The first and second furniture parts 10, 20, may be slidable relative to each other along said lengths L, L', in said interlocking engagement, to a decoupling state in which the male decoupling sections L2' overlap with the second locking element 60 and the female decoupling sections L2 overlap with the first locking element 50 to allow deliberate separation between the first furniture part 10 and the second furniture part 20. A facilitated separation may thus be provided. The male decoupling sections L2' may thus freely slide past the second locking element 60 without engaging the latter with a retention force.

Likewise, the female decoupling sections L2 may freely slide past the first locking element 50 without engaging the latter. The male and female decoupling sections L2', L2, may comprise flat surfaces, free from e.g. protrusions 240 and grooves 270.

Figure 6:
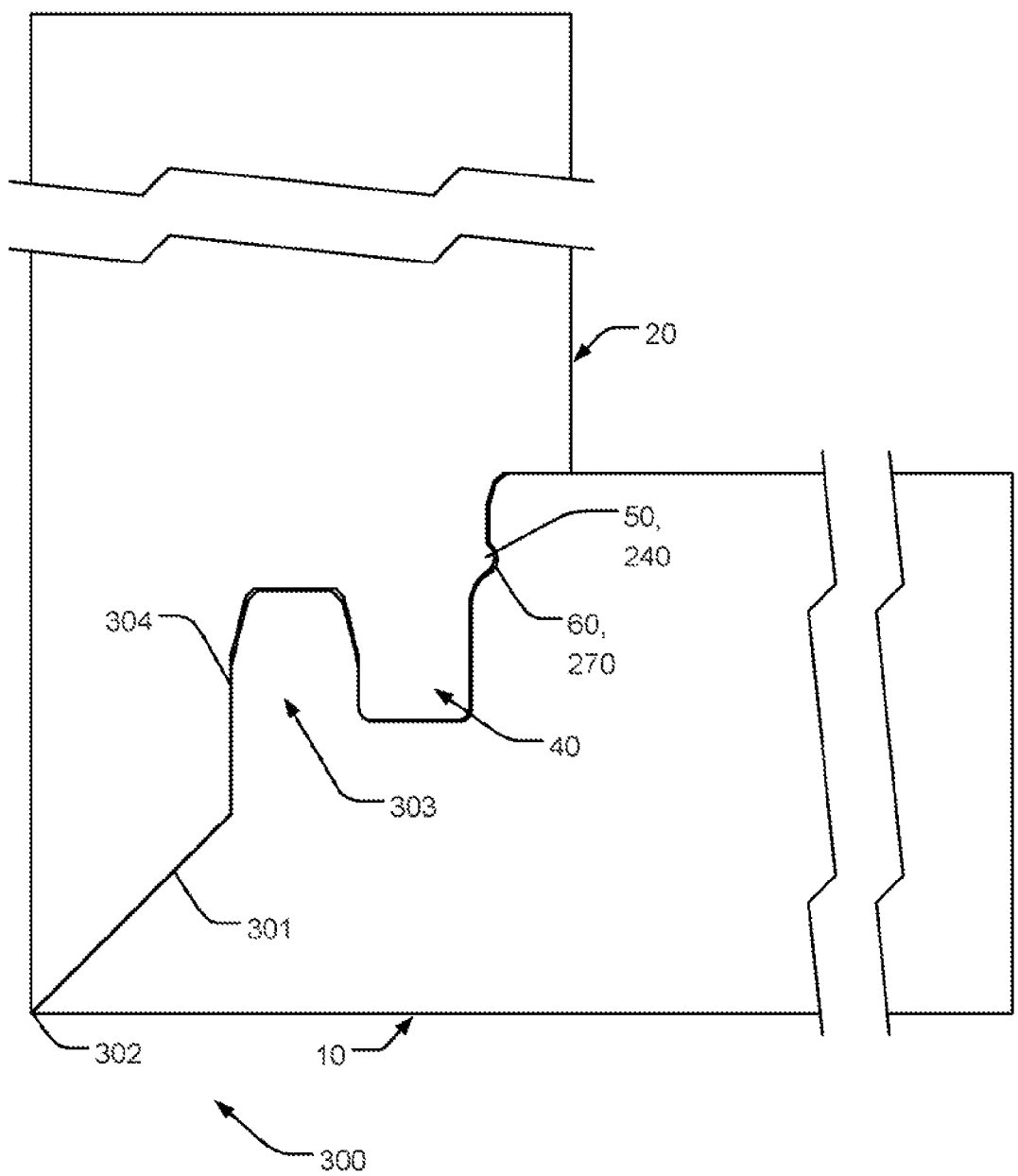
FIG. 6 shows a side view of a corner joint of the joining system.

The first and second furniture parts 10, 20 may be joined along an inclined corner surface 301 at a corner joint 300 thereof, as illustrated in FIG. 6. The corner surface 301 may be have an inclination of 45 degrees. The first and second furniture parts 10, 20 may comprise mutual interlocking surfaces formed as a recess 304 in the second furniture part and a protrusion 303 in the first furniture part 10. The recess 304 may be arranged between the male coupling tongue 40 and a corner edge 302 of the corner joint 300. A robust and reliable corner joint 300 may thus be provided.

Figure 10:
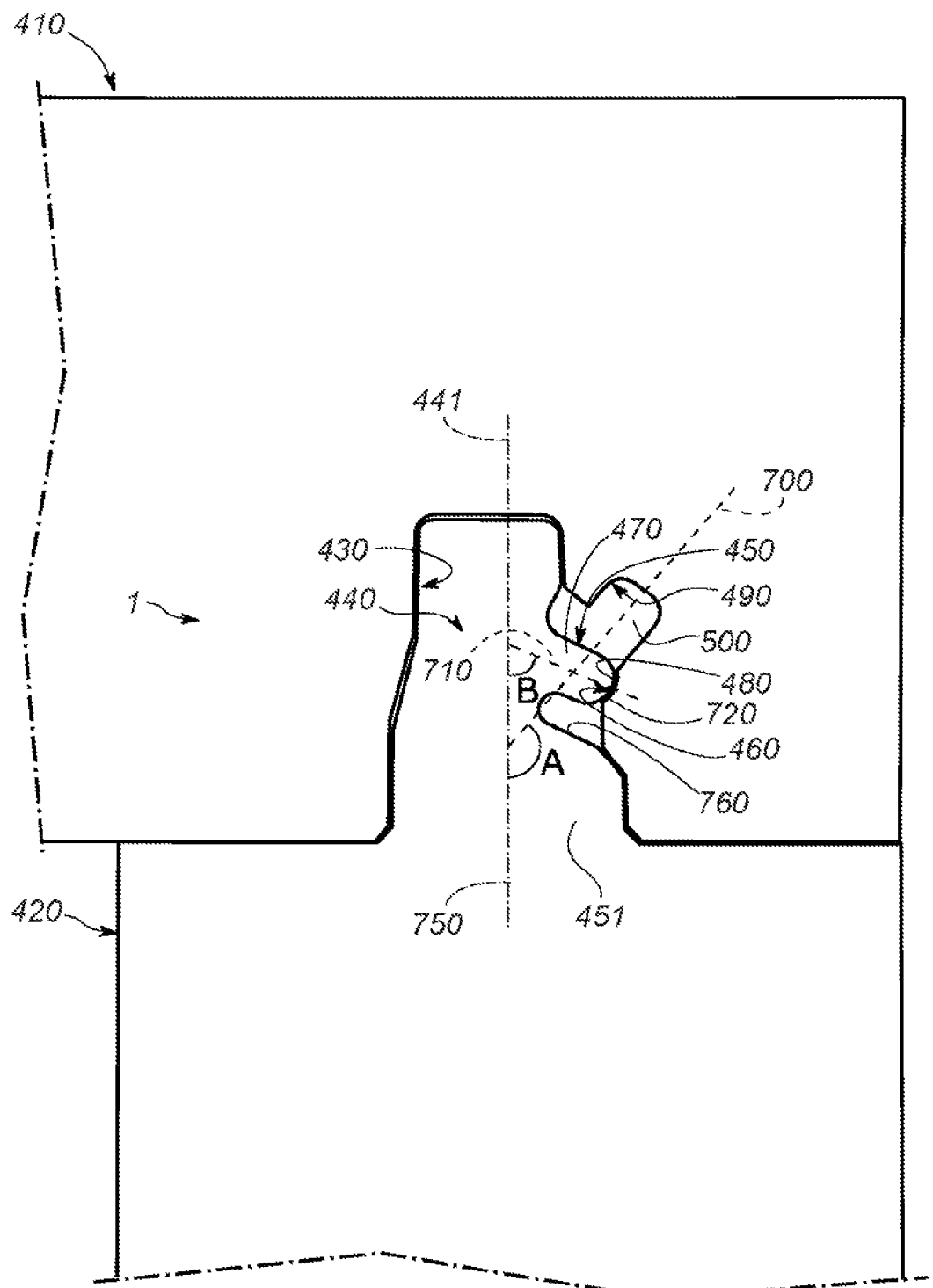
FIG. 10 shows an enlarged side view of a joining system according to an example of the disclosure, applied on an exemplifying basic furniture 90-degree corner joint between two furniture parts. The figure shows the joining system in a fully joined and locked position, wherein a male coupling tongue extending from one of the furniture parts is engaged in a female coupling recess formed in the other furniture part.

With reference to FIG. 10, this figure shows an enlarged side view of a joining system 1, applied on an exemplifying basic furniture 90-degree corner joint between two furniture parts 410, 420. FIG. 10 shows the joining system 1 in a fully joined and locked position. The joining system 1 comprises a female coupling recess 430 formed in a first furniture part 410, and a male coupling tongue 440 projecting from the adjoining second furniture part 420. The female coupling recess 430 is adapted to receive the male coupling tongue 440. The male coupling tongue 440 comprises a first locking element 450 configured for a snap joint interlocking engagement with a matching second locking element 460 in the female coupling recess 430. The first locking element 450 on the male coupling tongue 440 comprises a flexible locking protrusion 470 integrally formed in the male coupling tongue 440.

This locking protrusion 470 extends laterally from the male coupling tongue 440. The second locking element 460 in the female coupling recess 430 comprises a locking groove 480.

The female coupling recess 430 comprises a coupling release channel 490 with an open end 500 facing the flexible locking protrusion 470 of the male coupling tongue 440 when locked in the female coupling recess 430. The coupling release channel 490 is adapted for receiving a coupling release rod. The coupling release rod may be an elongated rod having cross-sectional dimensions that fits inside the coupling release channel 490, as illustrated in e.g. FIG. 15. The coupling release rod may engage the flexible locking protrusion 470 and force the flexible locking protrusion 470 to flex out of its engagement with the locking groove 480 in the female coupling recess 430 so as to deliberately separate the first furniture part 410 from the second furniture part 420. Having a flexible locking protrusion 470 integrally formed in the male coupling tongue 440 and a female coupling recess 430 comprising a locking groove 480 to receive the flexible locking protrusion 470, as well as a coupling release channel 490 with an open end 500 facing the flexible locking protrusion 470 provides for a joining system 1 which is less complex to manufacture, and which is robust, but yet allows for easy disassembly if desired.

E.g. a drawback of prior art joining system is that a separate flexible polymer tongue is typically required for the interlocking of the furniture parts, which has to be pre-fitted during manufacture. This may increase the complexity of the production line and the manufacturing process as well as the joining system. The joining system can also become more expensive as a result. The throughput of the production line in mass production may also be more limited. Furthermore, in such previous joining systems, the separate polymer tongue must typically be removed, as a separate piece, in order to disassemble the furniture parts. The joining system 1 as described in the present disclosure comprising a coupling release channel 490 with an open end 500 facing the flexible locking protrusion 470 allows for facilitated disassembly by instead forcing the flexible locking protrusion 470 out of its engagement with the locking groove 480 with a coupling release rod. In addition to providing for a more robust and stronger joining system 1 which can absorb greater force loads in more directions—due to its single-piece integrated construction—it also allows for a facilitated repeated assembly and disassembly by the user, should it be desired, due to the reduced number of separate parts. The furniture parts 410, 420, may correspond to various parts of pieces of different furniture items to be assembled together utilizing the joining system 1, such as drawers, wardrobes, shelves, desks, cabinets, etc.

Figure 11:
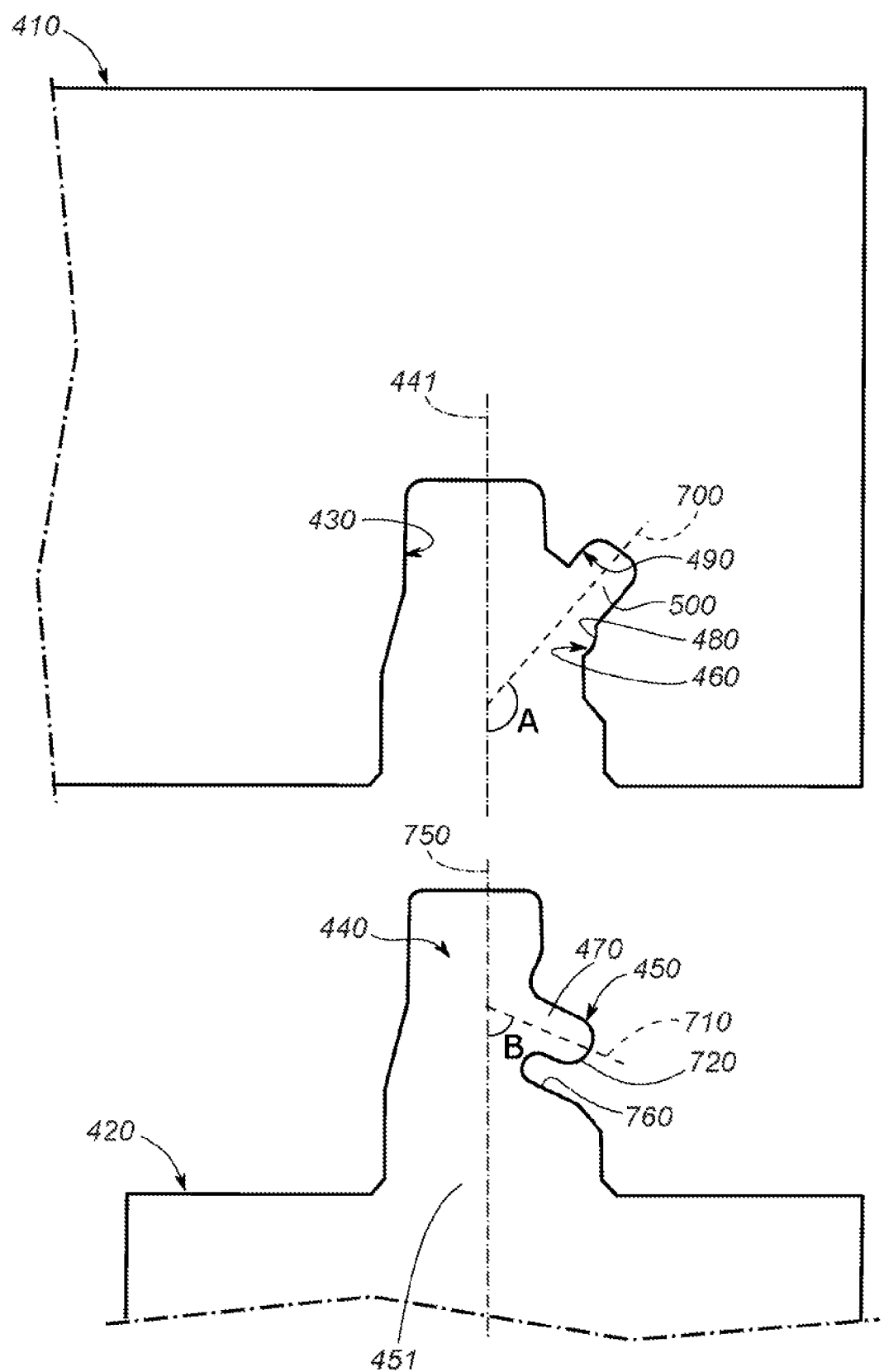
FIG. 11 shows an enlarged side view similar to the one in FIG. 10, only here in a position before the male coupling tongue of the second furniture part has engaged the female coupling recess of the first furniture part.

FIG. 11 shows an enlarged side view similar to the one in FIG. 10, only here in a position before the male coupling tongue 440 of the second furniture part 420 has engaged the female coupling recess 430 of the first furniture part 410. As seen in the example of FIG. 11, the coupling release channel 490 may be inclined relative to a longitudinal direction 441 of the female coupling recess 430 with an inclination angle (A). I.e., the longitudinal axis 700 of the coupling release channel 490 forms inclination angle (A) with the longitudinal direction 441 as shown. This provides for a facilitated and more effective engagement of the flexible locking protrusion 470 with a coupling release rod. The inclination angle (A) may be in an interval of 30 to 60 degrees in examples of the disclosure. The inclination angle (A) may be in an interval of 36 to 46 degrees for a further facilitated engagement with the flexible locking protrusion 470. The inclination angle (A) may be essentially 41 degrees in a particularly advantageous example, as illustrated in FIG. 11.

As may also be seen in FIG. 11, the flexible locking protrusion 470 may be inclined relative to a longitudinal direction 750 of the male coupling tongue 440 with an inclination angle (B). The inclination angles (A) and (B) may be optimized in relation to each other to provide for an effective transfer of momentum onto the flexible locking protrusion 470 as coupling release rod 410 is inserted into the coupling release channel 490. The flexible locking protrusion 470 may be inclined relative to the longitudinal direction 750 of the male coupling tongue 440 with an acute inclination angle (B). This may provide for a facilitated joining of the male coupling tongue 440 with the female coupling recess 430, as well as an increased retention force between the first and second locking elements 450, 460, in the interlocking engagement. The inclination angle (B) may be in the interval 40 to 73 degrees for a further facilitated joining of the furniture parts 410, 420, and a strong interlocking engagement. The inclination angle (B) may be essentially 64 degrees in a particularly advantageous example, as illustrated in e.g. FIG. 11.

Figure 12:
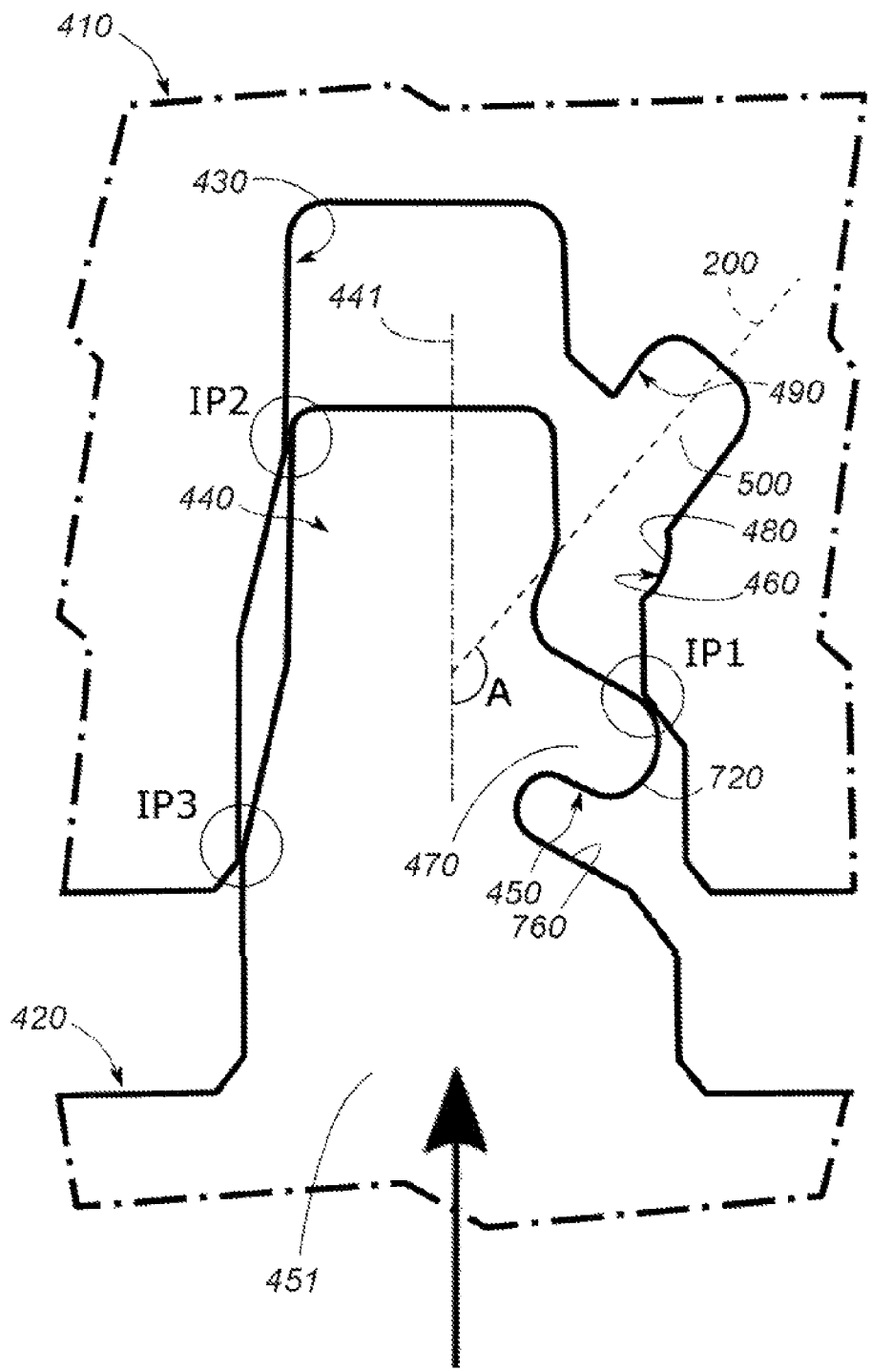
FIG. 12 shows a further enlarged side view of the joining system, where the male coupling tongue is shown in an introductory joining position where the flexible locking protrusion has come to a temporary rest on an inclined guiding surface and the male coupling tongue is in initial contact with two guiding surfaces of the female coupling recess.

FIG. 12 shows a further enlarged side view of the joining system 1, where the male coupling tongue 440 is shown in an introductory joining position where the flexible locking protrusion 470 has come to a temporary rest on an inclined guiding surface IP1, and the male coupling tongue 440 is in initial contact with two guiding surfaces IP2 and IP3 of the female coupling recess 430. The two guiding surfaces IP2, IP3, of the female coupling recess 430 guides the male coupling tongue 440 into the correct position inside the female coupling recess 430, while flexible locking protrusion 470 is positioned against the inclined guiding surface IP1 so that a force will subsequently be applied by the latter onto the flexible locking protrusion 470. Having an inclined guiding surface IP1 as shown may provide for a facilitated deflection of the flexible locking protrusion 470.

Figure 13:
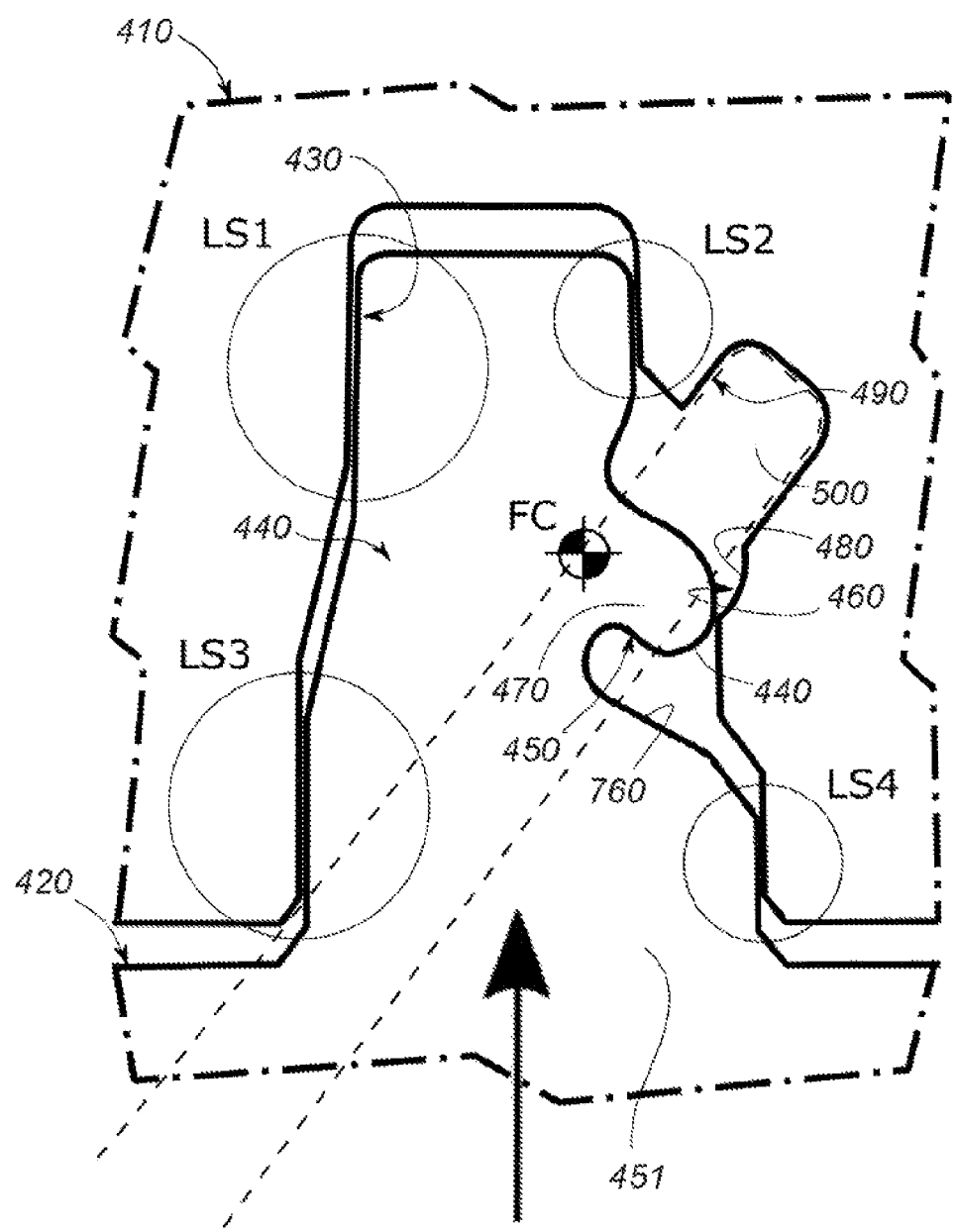
FIG. 13 shows a further enlarged side view of the joining system, where the male coupling tongue has been pushed further into engagement within the female coupling recess. Here, during the insertion, the flexible locking protrusion is forced to temporarily elastically deflect inwardly towards the male coupling tongue just before entering the locking groove in the female coupling recess. During said elastic deflection of the flexible locking protrusion, the remaining male coupling tongue is held in lateral alignment with the female coupling recess by four locking surfaces arranged therein.

FIG. 13 shows a further enlarged side view of the joining system, where the male coupling tongue 440 has been pushed further into engagement within the female coupling recess 430. Here, during the insertion, the flexible locking protrusion 470 is forced to temporarily elastically deflect inwardly towards the male coupling tongue 440 just before entering the locking groove 480 in the female coupling recess 430. During said elastic deflection of the flexible locking protrusion 470, the remaining male coupling tongue 440 may be held in lateral alignment with the female coupling recess 430 by four locking surfaces LS1, LS2, LS3, and LS4, arranged therein, as illustrated in FIG. 13. This may provide for increased stability and correct guiding of the female coupling recess 430 and the male coupling tongue 440 into the final interlocking engagement.

Figure 14:
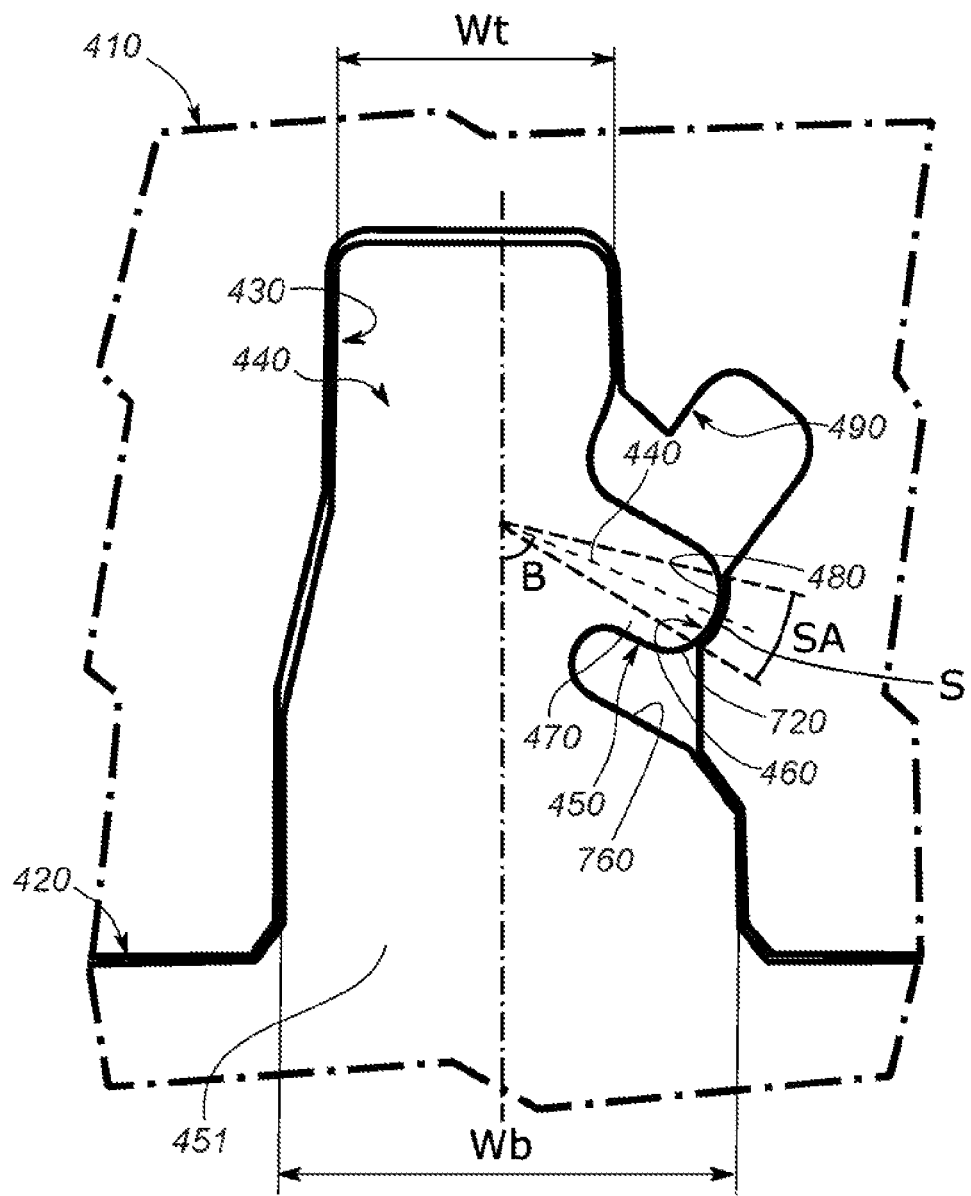
FIG. 14 shows a further enlarged side view of the joining system, where the male coupling tongue has been pushed further into full engagement within the female coupling recess. Here, the flexible locking protrusion has snapped into engagement with the locking groove in the female coupling recess and thus prevents the male coupling tongue from separating from the female coupling recess.

FIG. 14 shows a further enlarged side view of the joining system, where the male coupling tongue 440 has been pushed further into full engagement within the female coupling recess 430. Here, the flexible locking protrusion 470 has snapped into engagement with the locking groove in the female coupling recess 430 and thus prevents the male coupling tongue 440 from separating from the female coupling recess 430. As shown in FIG. 14, the flexible locking protrusion 470 may exhibit a curved bulb-shaped tip portion 720 adapted to engage a matching curved portion 430 of said locking groove 480 in the female coupling recess 430. A curved bulb-shaped tip portion 420 may provide for facilitated engagement of the flexible locking protrusion 470 with the locking groove 480, as well as an increased retention force therebetween. The curved bulb-shaped tip portion 720 of the flexible locking protrusion 470 may be shaped to engage the curved portion of said locking groove 480 in the female coupling recess 430 along a partial segment (S) of said tip portion 720, defined by a limited segment angle (SA) uniformly straddling a longitudinal symmetry axis 441 of the flexible locking protrusion 470. The length of the partial segment (S), and its associated segment angle (SA) may be optimized to provide for a facilitated joining of the flexible locking protrusion 470 and the locking groove 480 while providing for a robust interlocking engagement therebetween.

Figure 15:
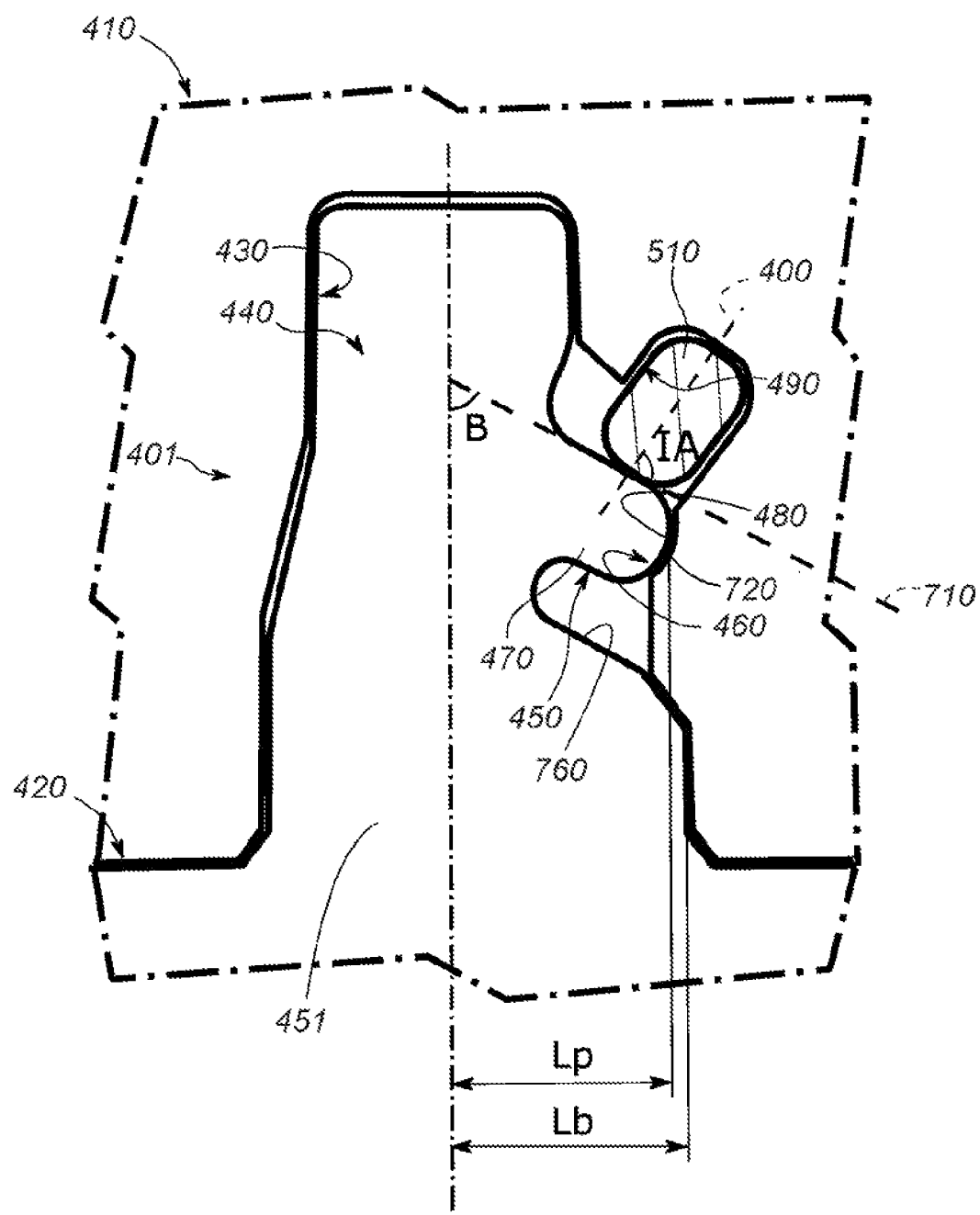
FIG. 15 shows a similar view as in FIG. 14, but with a coupling release rod partially inserted in the coupling release channel prior to releasing the joint.

FIG. 15 shows a similar view as in FIG. 14, but with a coupling release rod 510 partially inserted in the coupling release channel 490 prior to releasing the joint. In the example shown in FIG. 15, the lateral extension (Lb) of the base portion 450 of the male coupling tongue 440 relative to a longitudinal axis 750 of said male coupling tongue 440 exceeds the lateral extension (Lb) of the of flexible locking protrusion 470 relative to said longitudinal axis 750 of said male coupling tongue 440.

The joining system 1 may comprise a slot 760 arranged between the flexible locking protrusion 470 and the base portion 450 of the male coupling tongue 440, as schematically shown in e.g. FIG. 15. The slot 760 is adapted to leave room for the flexible locking protrusion 470 to deflect in the direction of said base portion 450 when the coupling release rod 510 is inserted into the coupling release channel 490. This may thus provide for a facilitated deflection of the flexible locking protrusion 470. E.g. the force required to interlock the male coupling tongue 440 with the female coupling recess 430 may be reduced. The slot 760 may extend essentially in parallel with the flexible coupling release protrusion 470, which may further facilitate the deflection of the flexible locking protrusion 470.

Figure 16:
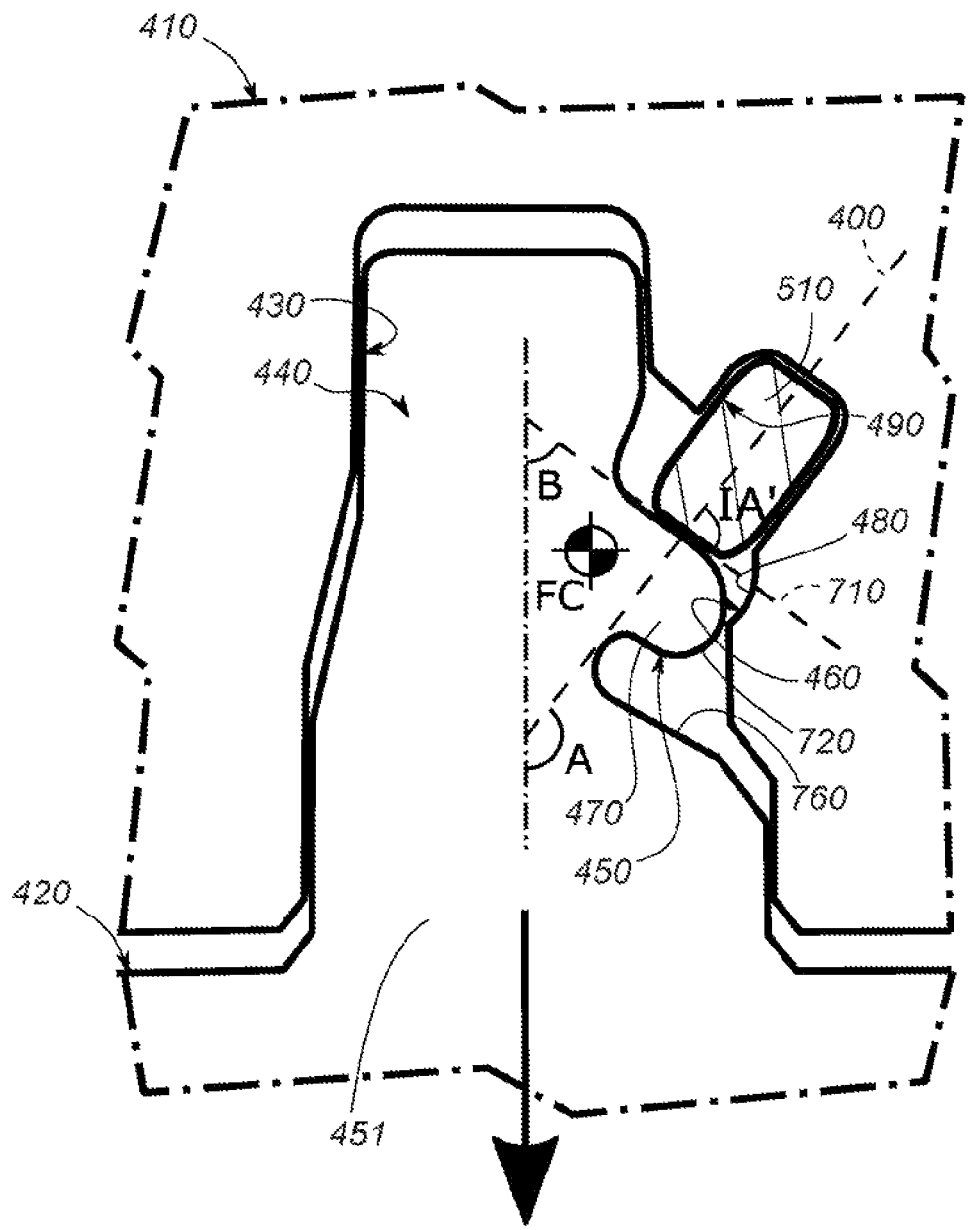
FIG. 16 shows a similar view as in FIG. 15, where an unlocking section of a coupling release rod has entered the coupling release channel, forcing the flexible locking protrusion to flex out of its engagement with the locking groove in the female coupling recess so as to deliberately separate the first furniture part from the second furniture part.

The coupling release rod 510 may be at least partly tapered having an increasing cross-sectional area from, or at a distance from, a tip portion 720 thereof towards a base portion 430 thereof. Thus, as the coupling release rod 510 is gradually inserted into the coupling release channel 490, the increasing size of the cross section may push against the flexible coupling release protrusion 470, as shown in the example of FIG. 16. It should however be understood that in other examples, the flexible coupling release protrusion 470 may be sufficiently pushed to be released from the locking groove 480 with a coupling release rod 510 having a constant cross-section. Having an at least partly tapered coupling release rod 510 may in some examples facilitate the deflection of the flexible coupling release protrusion 470 and the separation of the joining system 1.

FIG. 16 shows a similar view as in FIG. 15, where an unlocking section 490 of the coupling release rod 510 has entered the coupling release channel 490, forcing the flexible locking protrusion 480 to flex out of its engagement with the locking groove 480 in the female coupling recess 430 so as to deliberately separate the first furniture part 410 from the second furniture part 420. The unlocking section 490 of the coupling release rod 510 may be tapered.

With reference now to both FIG. 15 and FIG. 16, a longitudinal axis 700 of the coupling release channel 490 and a longitudinal axis 710 of the flexible locking protrusion 470 may intersect at a first intersection angle (IA) when the flexible locking protrusion 470 of the male coupling tongue 440 is seated in the locking groove 480 of the female coupling recess 430. The first intersection angle (IA) may be increased to a second intersection angle (IA') when the tapered coupling release rod 510 is introduced into the coupling release channel 490 to a point of release between said flexible locking protrusion 470 and the locking groove 480 of the female coupling recess 430. In this position, the flexible locking protrusion 470 is deflected out of engagement with the locking groove 480 by the coupling release rod 510. In one example, the first intersection angle (IA) may be less than 490 degrees, and the second intersection angle (IA') may be essentially 90 degrees or more than 90 degrees.

The flexible locking protrusion 470 may be essentially perpendicular to the coupling release channel 490 when the coupling release rod 510 is inserted to a point of release of said coupling protrusion 470 as it leaves the locking groove 480 in the female coupling recess 430. I.e. the longitudinal axis 700 of the coupling release channel 490 may be essentially perpendicular to the longitudinal axis 710 of the flexible locking protrusion 470.

Figure 17:
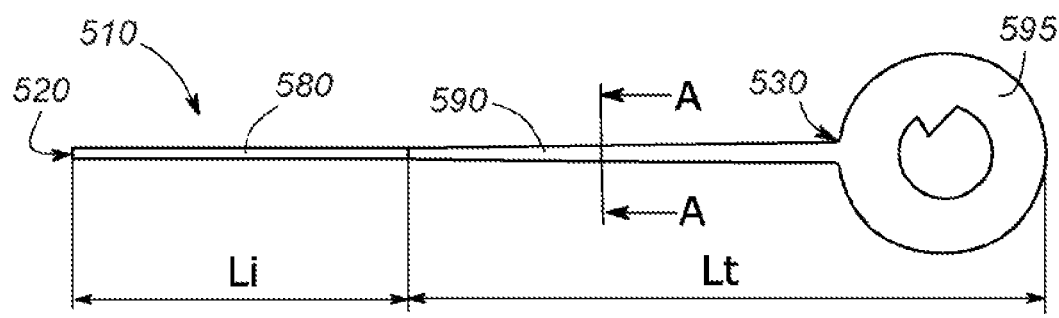
FIG. 17 shows an enlarged sideview of a coupling release rod according to an example of the disclosure, where a tapering unlocking section exhibits a linear tapering profile.
Figure 18:
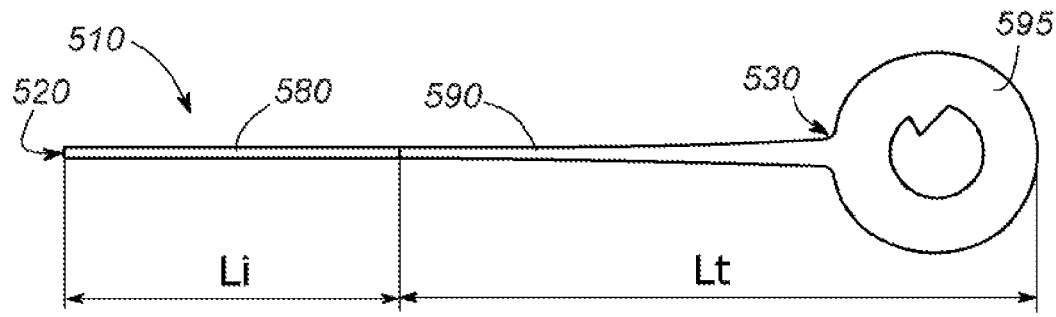
FIG. 18 shows an enlarged sideview of a coupling release rod according to an example of the disclosure, where a tapering unlocking section exhibits a concave tapering profile.
Figure 19:
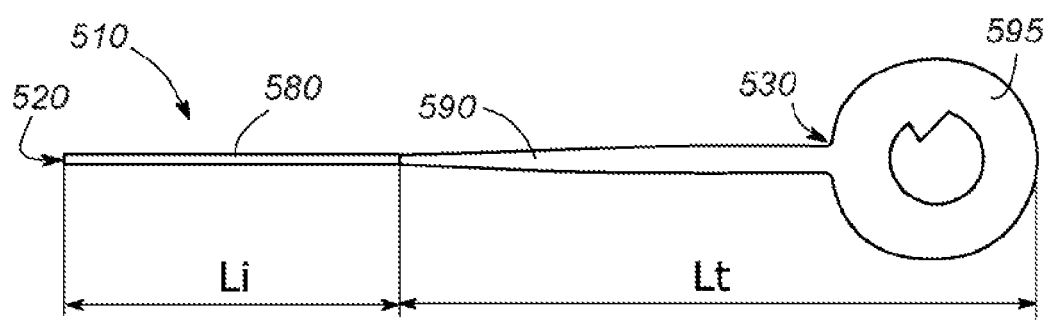
FIG. 19 shows an enlarged sideview of a coupling release rod according to an example of the disclosure, where a tapering unlocking section exhibits a convex tapering profile.

As demonstrated in FIGS. 17, 18 and 19, the coupling release rod 510 may comprise an introductory section 580 with a constant cross-sectional area, extending from said tip portion 720 to a tapered unlocking section 590 with an increasing cross-sectional area towards the base portion 530 of said coupling release rod 510.

The length (Lt) of the tapered unlocking section 590 may exceed the length (Li) of the introductory section 580. The introductory section 580 may provide for facilitated guiding of the coupling release rod 510 into the coupling release channel 590 before the tapered unlocking section 590 start to push the flexible locking protrusion 470 for release. The length (Li) of the introductory section may be from 30% to 50% of the length (Lt) of the tapered unlocking section 590 in some examples. The length (Li) of the introductory section 580 may in one advantageous example be 40% of the length (Lt) of the tapered unlocking section 590.

Furthermore, FIG. 17 shows a first example of a tapered coupling release rod 510, where the tapering unlocking section 590 exhibits a linear tapering profile. FIG. 18 shows a second example of a tapered coupling release rod 510, where the tapering unlocking section 590 exhibits a concave tapering profile. FIG. 19 shows an enlarged sideview of a tapered coupling release rod 510, where the tapering unlocking section 590 exhibits a convex tapering profile. As seen in FIGS. 17, 18 and 19, the coupling release rod 510 may comprise a manipulation handle 595 at its base portion 530. The coupling release rod 510 may be made of a polymer material. It may alternatively, or in addition, be made of other materials such as metal.

Figure 20:
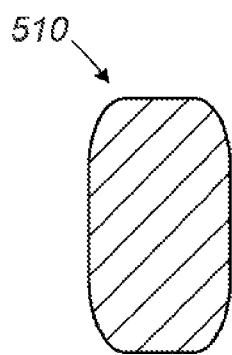
FIG. 20 shows a cross-sectional view of a first exemplary cross-sectional shape of the coupling release rod.

FIG. 20 shows a cross-sectional view of a first exemplary cross-sectional shape of the coupling release rod 510. In this example the coupling release rod 510 comprises a generally rectangular cross-section.

Figure 21:
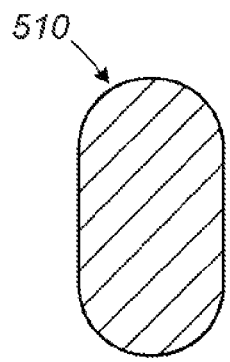
FIG. 21 shows a cross-sectional view of a second exemplary cross-sectional shape of the coupling release rod.

FIG. 21 shows a cross-sectional view of a second exemplary cross-sectional shape of the coupling release rod 510. In this example the coupling release rod 510 also comprises a generally rectangular cross-section, although here it is a more rounded at the edges.

Figure 22:
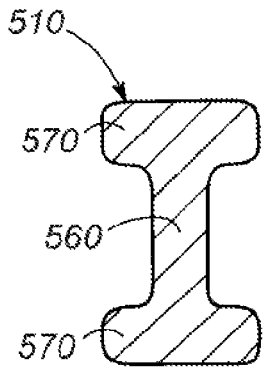
FIG. 22 shows a cross-sectional view of a third exemplary cross-sectional shape of the coupling release rod.

FIG. 22 shows a cross-sectional view of a third exemplary cross-sectional shape of the coupling release rod 510. In this example the coupling release rod 510 comprises a generally I-beam shaped cross-section, with a central waist portion 560 located between two laterally extending end portions 570.

Figure 23:
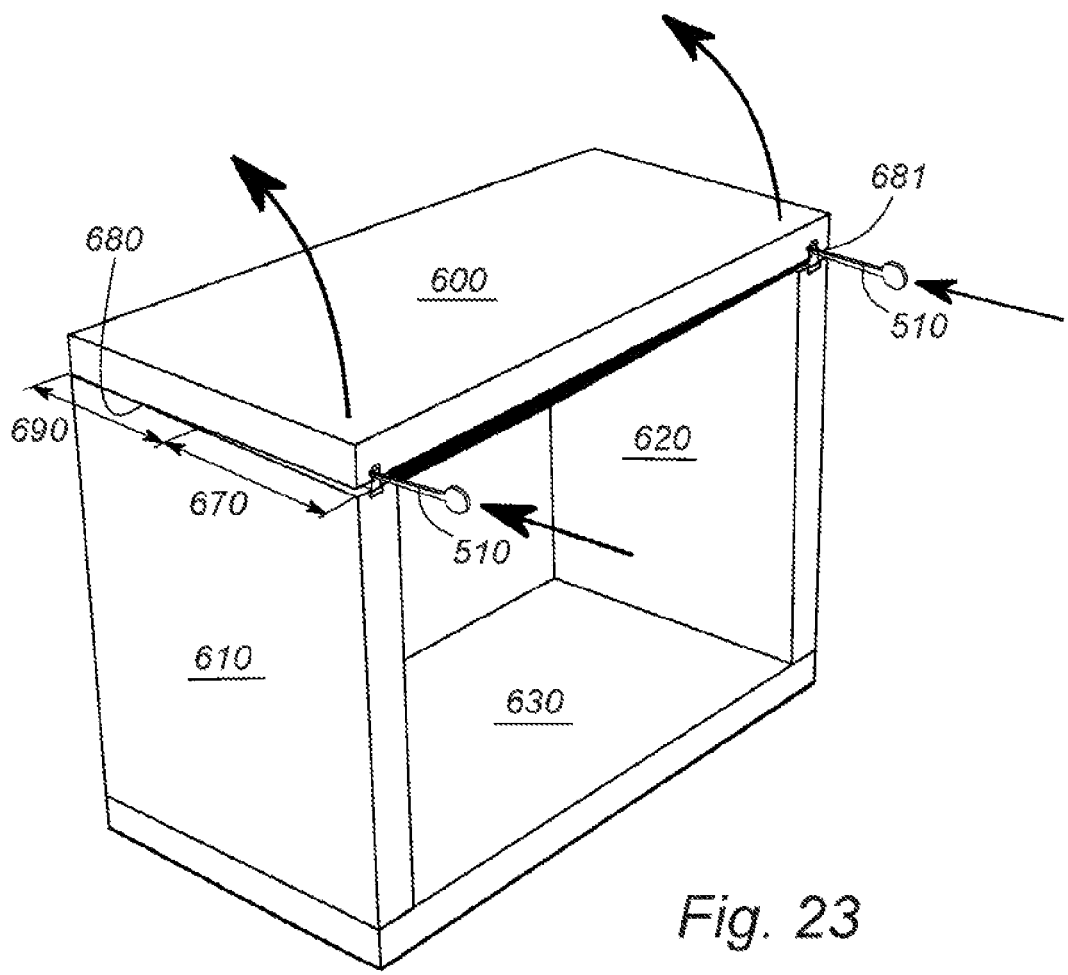
FIG. 23 shows a perspective view of a drawer comprising joining systems according to examples of the disclosure being disassembled at two upper furniture joints by two coupling release rods.

FIG. 23 shows a perspective view of a drawer comprising two joining systems 1 as described above, and denoted as upper furniture joints 680, 681, in FIG. 23. FIG. 23 is a schematic illustration of the upper furniture joints 680, 681, being disassembled by two coupling release rods 510.

Figure 24A:
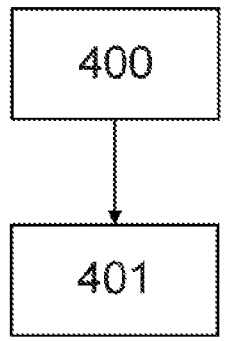
FIGS. 24A-B show flow charts of a method for unlocking a joining system for furniture parts.

FIG. 24A is a related flow chart of a method 400 for unlocking a joining system 1 for furniture parts 410, 420, as described above with reference to FIGS. 10-24B. The method 400 comprises unlocking 401 the joining system 1 by inserting a coupling release rod 510 into the coupling release channel 490, thus forcing the flexible locking protrusion 470 to flex out of its engagement with the locking groove 480 in the female coupling recess 430 for deliberately separating the first furniture part 410 from the second furniture part 420.

Figure 24B:
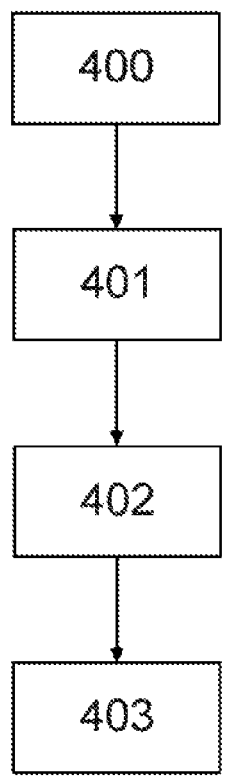

FIG. 24B is another flowchart of a method 400 for unlocking a joining system 1 for furniture parts 410, 420. The method 400 may further comprise angling 402 the second furniture part 420 relative to the first furniture part 410, or vice versa, following initial unlocking of a first stretch 470 of a furniture joint 480, where said angling results in progressive unlocking of a remaining stretch 490 of said furniture joint 480.

The method 400 may comprise unlocking 403 two furniture joints 680, 681, located at a distance from each other in a common furniture part 600 and two other corresponding furniture parts 610, 620 by inserting a coupling release rod into the coupling release channels 490 of each furniture joint 680, 681. The coupling release rod may be inserted simultaneously into the coupling release channels 490 of each furniture joint 680, 681.

Figure 25:
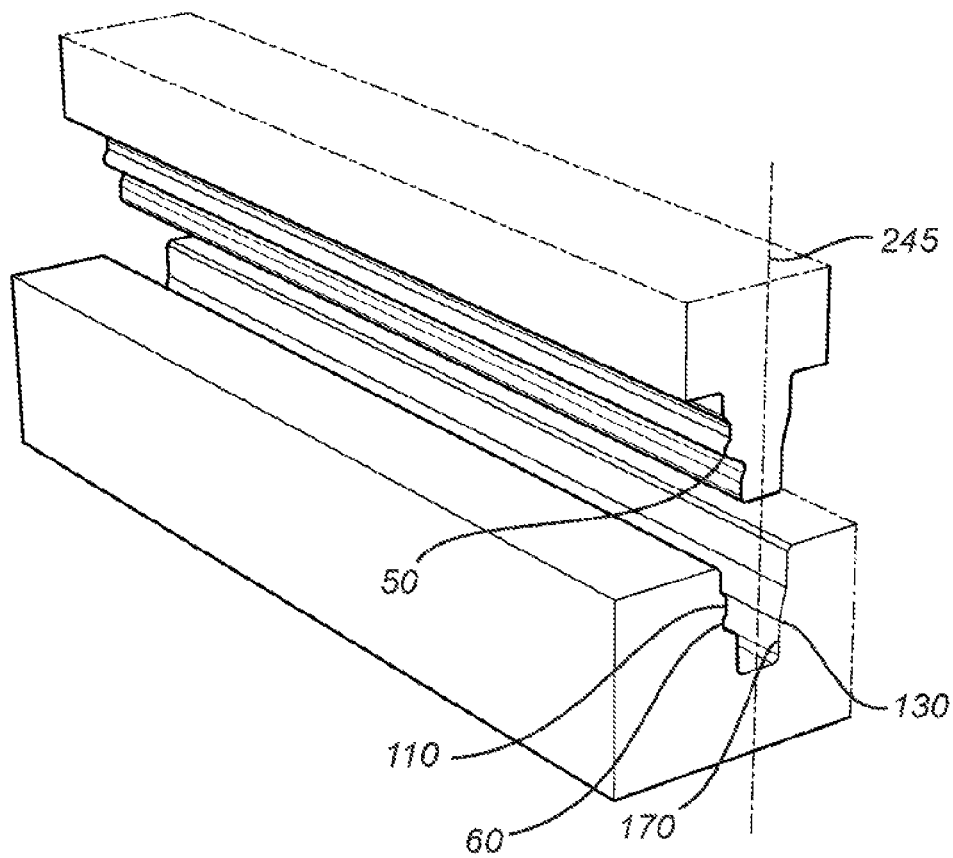
FIG. 25 shows a perspective view of the joining system of the embodiment described with reference 2, in a frontal view.

FIG. 25 shows a perspective view of the joining system of the embodiment described with reference 2, in a frontal view. The joining system comprises a female coupling recess formed in a first furniture part, and a male coupling tongue projecting from an adjoining second furniture part. The female coupling recess is adapted to receive the male coupling tongue, and the male coupling tongue comprises a first locking element 50 configured for a snap joint interlocking engagement with a matching second locking element 60 in the female coupling recess. The male coupling tongue is configured to be more flexible than the female coupling recess.

The material surrounding the female coupling recess is thus more rigid than the male coupling tongue. The male coupling tongue may be configured to be essentially resilient whereas the female coupling recess is configured to be essentially rigid and non-resilient. An upper guiding surface 110 is arranged on a first side of the female coupling recess on the first furniture part. The upper guiding surface 110 forms an essentially rigid or non-resilient guide for the male coupling tongue upon insertion thereof, limiting movement of the male coupling tongue in a direction towards the first side of the female coupling recess. The joining system comprises a lower guiding surface 130 arranged on a second side of the female coupling recess on the first furniture part, located opposite to said first side thereof. The lower guiding surface 130 is configured to force the male coupling tongue to resiliently deflect whilst in engagement with the upper guiding surface 110 upon further insertion thereof in a deflection movement. The male coupling tongue is deflected towards the first side 115 of the female coupling recess, until the first locking element 50 of the male coupling tongue snaps together with the matching second locking element 60 of the female coupling recess, i.e. to assume the joined state shown in FIG. 1. The first locking element 60 may comprise an integral protrusion 60 integrally formed in the male coupling tongue. The protrusion 60 may extend in a direction essentially perpendicular to a longitudinal direction 245 in which the male coupling tongue extends. The second locking element 60 may comprise a recess 60 for receiving the protrusion 60.

The lower guiding surface 130 at its lowest end transitions into a lateral locking surface 170 extending essentially parallelly to a longitudinal direction of the female coupling recess. The lateral locking surface 170 is configured to exert a horizontal pressure on the male coupling tongue towards the first side of the female coupling recess. The horizontal pressure holds the first and second locking elements 50, 60 of the male coupling tongue and the female coupling recess in engagement with each other in a joined state between the first furniture part and the second furniture part. The first and second furniture parts may thus be joined at a 90 degree angle as illustrated in e.g. FIG. 1. It should be understood that the first and second furniture parts may be joined at different angles, i.e. oblique or acute angles, besides from the perpendicular angle as illustrated in the example of FIG. 1.

Having a lower guiding surface 130 configured to force the male coupling tongue to resiliently deflect whilst in engagement with the upper guiding surface 110 upon further insertion of the male coupling tongue in a deflection movement towards the first side of the female coupling recess, until the first locking element 50 snaps together with the matching second locking element 60, provides for a robust joining system with an increased multi-directional side stability, while being less complex to manufacture. A further increased stability and increased strength in the interlocked state of the first and second furniture parts is provided for when having the first locking element 60 comprising an integral protrusion 60 integrally formed in the male coupling tongue. E.g. a drawback of prior art joining system is that a separate flexible polymer tongue is typically required for the interlocking of the furniture parts, which has to be pre-fitted during manufacture. This may increase the complexity of the production line and manufacturing process as well as the joining system as such becomes more expensive. The throughput of the production line in mass production may also be more limited. Thus, in addition to providing for a more robust and stronger joining system which can absorb greater force loads in more directions—due to its single-piece integrated construction—the manufacturing thereof is also facilitated. The furniture parts may correspond to various parts of pieces of different furniture items to be assembled together utilizing the joining system, such as drawers, wardrobes, shelves, desks, cabinets, etc.

Figure 26:
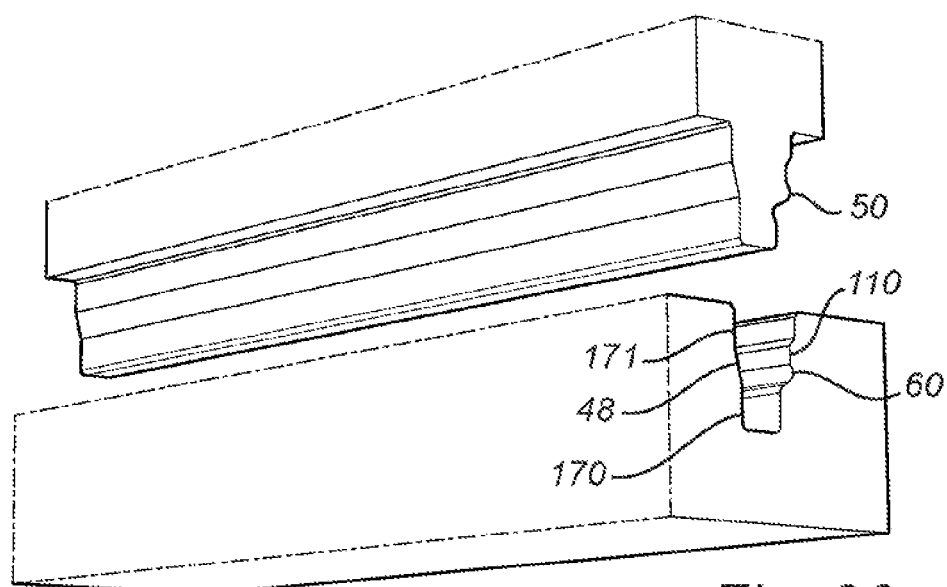
FIG. 26 shows a perspective view of the joining system of the embodiment described with reference 2, in a rear view.

FIG. 26 shows a perspective view of the joining system of the embodiment described with reference 2, in a rear view. The reference numerals of FIG. 26 are the same as in FIG. 25 and in FIGS. 1-2.

Figure 27:
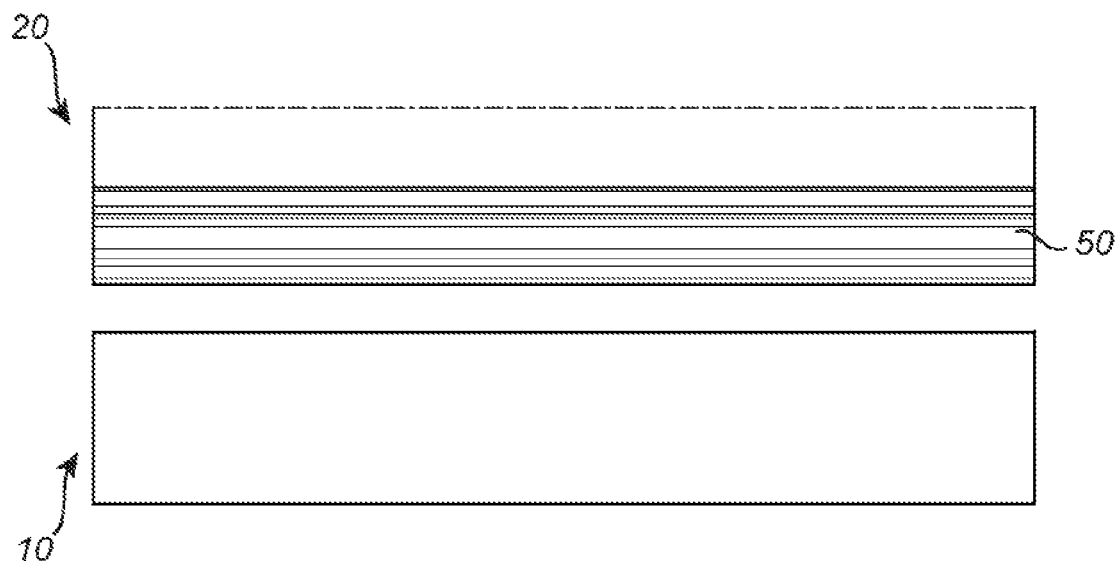
FIG. 27 shows a plain side view from the left of the joining system of the embodiment described with reference 2.

FIG. 27 shows a plain side view from the left of the joining system of the embodiment described with reference 2, showing the first 10 and second 20 furniture parts.

Figure 28:
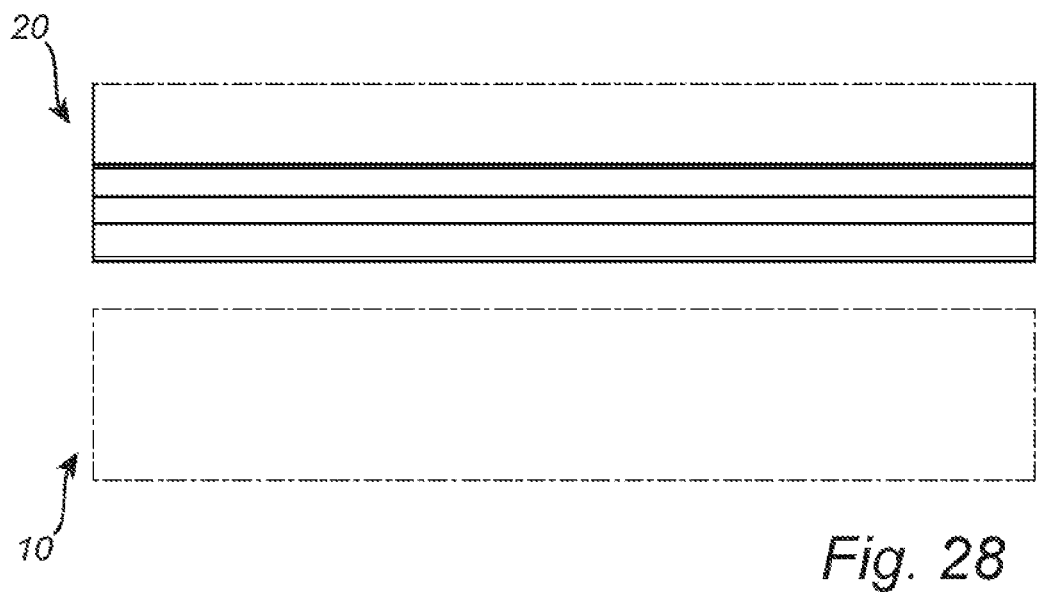
FIG. 28 shows a plain side view from the right of the joining system of the embodiment described with reference 2.

FIG. 28 shows a plain side view from the right of the joining system of the embodiment described with reference 2, showing the first 10 and second 20 furniture parts.

FIG. 29 shows a plain view from above of the joining system of the embodiment described with reference 2, showing the first 10 and second 20 furniture parts.

FIG. 30 shows a plain view from below of the joining system of the embodiment described with reference 2, showing the first 10 furniture part.

FIG. 31 shows a plain view from the front of the joining system of the embodiment described with reference 2. The reference numerals of FIG. 26 are the same as in FIG. 25 and in FIGS. 1-2.

FIG. 32 shows a plain view from the rear of the joining system of the embodiment described with reference 2. The reference numerals of FIG. 26 are the same as in FIG. 25 and in FIGS. 1-2.

Figure 33:
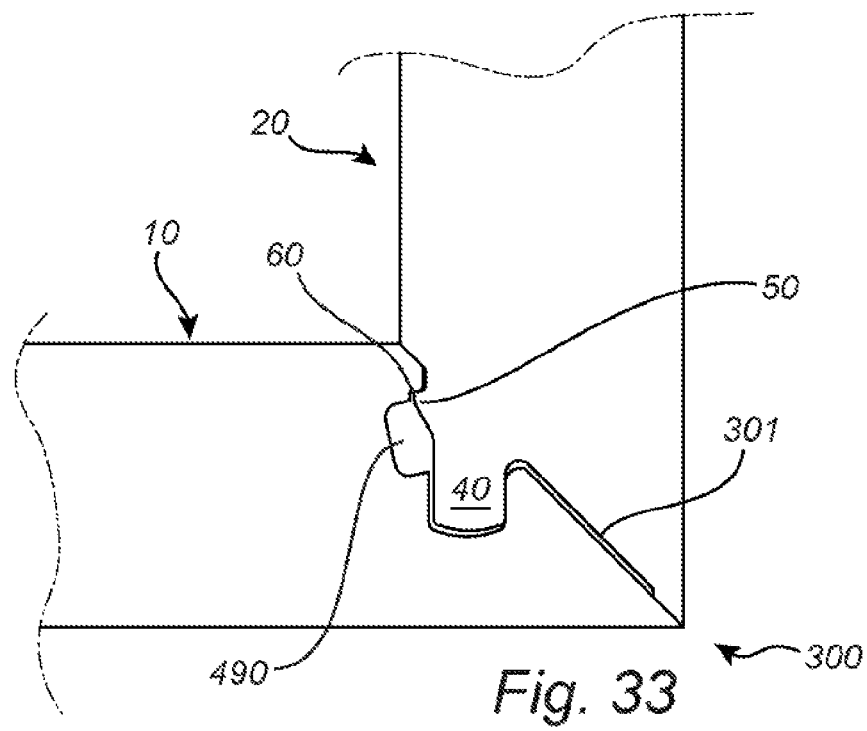
FIG. 33 shows an embodiment in which the locking system is a releasable locking system for a corner connection of two furniture elements.

FIG. 33 shows a schematic illustration of a joining system for furniture parts 10, 20 similar to the joining system disclosed with reference to FIG. 6. The joining system comprises a female coupling recess 30 formed in a first furniture part 10, and a male coupling tongue 40 projecting from an adjoining second furniture part 20. The female coupling recess 30 is adapted to receive the male coupling tongue 40, and the male coupling tongue 40 comprises a first locking element 50 configured for a snap joint interlocking engagement with a matching second locking element 60 in the female coupling recess 30. The male coupling tongue 40 is configured to be more flexible than the female coupling recess 30. In FIG. 33, just as in FIG. 6, the first and second furniture parts 10, 20 are joined along an inclined corner surface 301 at a corner joint 300 thereof. The corner surface 301 may have an inclination of about 45 degrees. The embodiment shown in FIG. 33 differs from the embodiment shown in FIG. 6 in that the first locking element 50 and second locking element 60 have substantially horizontal locking surfaces configured to engage each other for creating the snap joint locking. In addition, the embodiment of FIG. 33 also differs in that forms a releasable joint possible to release with the use of a coupling release rod placeable in a coupling release channel 490 placed adjacent to the male coupling tongue 40.

Figure 34:
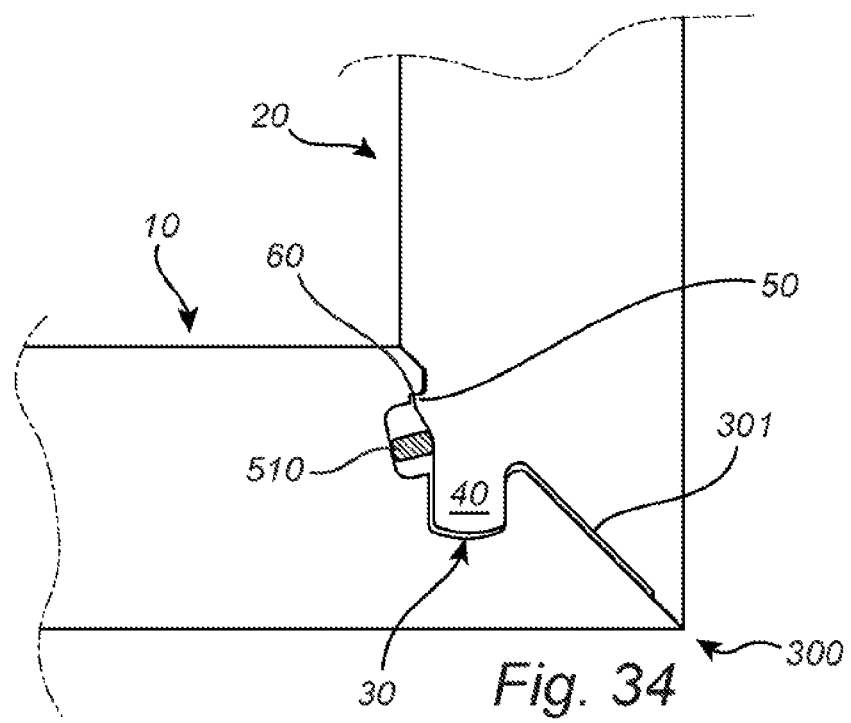
FIG. 34 shows an embodiment of the releasable locking system for a corner connection when a coupling release rod is inserted for releasing the connection.

FIG. 34 shows the same view as in FIG. 33 of the same embodiment of the locking system, but when a coupling release rod 510 is inserted in the coupling release channel 490 prior to releasing the joint. The coupling release rod 510 presses the male coupling tongue 40 to the right in the figure, which causes the first locking element 50 to disengage from the second locking element 60 which releases the lock such that the first 10 and second 20 furniture parts can be separated from each other. The coupling release rod 510 could for example be one of the coupling release rods described with reference to FIGS. 17-19. The insertion and pressure created by the coupling release rod 510 forces the male coupling tongue 40 to bend in a J-shape such that the upper portion of the male coupling tongue 40 is moved to the right in the figure.

The joining system according to the invention is equally applicable to a wide variety of materials, such as for example solid wood, laminated wood, different types of fibreboard materials like MDF or HDF materials, plastic or composite polymer materials like PVC, or other polymer materials and metals such as aluminium. The joining system may also be used for joining hollow profile beams in plastic, steel or aluminium.

It is to be understood that the present invention is not limited to the embodiments described above and illustrated in the drawings and a skilled person will recognize that many changes and modifications may be made within the scope of the appended claims.

The invention claimed is:

1. A joining system for furniture parts (10, 20), comprising
   a female coupling recess formed in a first furniture part, the first furniture part comprising a base surface on two sides of the female coupling recess,
   a male coupling tongue projecting from a base surface of an adjoining second furniture part, wherein the base surface extends on two sides of the male coupling tongue, said female coupling recess being adapted to receive the male coupling tongue, said male coupling tongue comprising a first locking element configured for a snap joint interlocking engagement with a matching second locking element in said female coupling recess, the male coupling tongue is shaped to be more flexible than the female coupling recess and is shaped to deflect in a first direction for creating the snap joint interlocking engagement,
   an upper guiding surface arranged on a first side of the female coupling recess on the first furniture part, forming a guide for the male coupling tongue upon insertion thereof, limiting movement of said male coupling tongue in a direction towards said first side of the female coupling recess,
   a lower guiding surface arranged on a second side of the female coupling recess on the first furniture part, located opposite to said first side thereof, said lower guiding surface is configured to engage the male coupling tongue to force the male coupling tongue to resiliently deflect, and the male coupling tongue is shaped to resiliently deflect in the first direction whilst the male coupling tongue is in engagement with said upper guiding surface upon further insertion thereof in a deflection movement towards said first side of the female coupling recess, until the first locking element of the male coupling tongue snaps together with the matching second locking element of the female coupling recess, wherein said lower guiding surface at its lowest end transitions into a lateral locking surface extending essentially parallelly to a female coupling recess direction of the female coupling recess, and wherein the base surfaces extending on two sides of the male coupling tongue are configured to rest against the base surfaces on two sides of the female coupling recess when the joining system is in the joined state.

2. The joining system according to claim 1, wherein said lower guiding surface is configured to engage the male coupling tongue, and wherein the male coupling tongue is configured to resiliently deflect whilst in engagement with said upper guiding surface upon further insertion thereof in a curved J-shaped deflection movement towards said first side of the female coupling recess, until the first locking element of the male coupling tongue snaps together with the matching second locking element of the female coupling recess.

3. The joining system according to claim 1, wherein the upper guiding surface extends essentially in parallel with the female coupling recess direction of the female coupling recess, and wherein the upper guiding surface extends directly from the second locking element of the female coupling recess in a direction towards an insertion opening of said female coupling recess.

4. The joining system according to claim 1, wherein the lower guiding surface is curved.

5. The joining system according to claim 1, wherein the lower guiding surface is inclined relative to the female coupling recess direction of the female coupling recess.

6. The joining system according to claim 1, wherein side support surfaces extend perpendicular from a base portion of the male coupling tongue on the second furniture part for direct abutment against support surfaces on the first furniture part, providing symmetrical side stability and bending resistance in a locked and joined state between the first furniture part and the second furniture part.

7. The joining system according to claim 1, wherein a width at a base portion of the male coupling tongue is wider than a width of the male coupling tongue at the first locking element thereof.

8. The joining system according to claim 1, wherein the first locking element extends such that it comes to rest at an edge of the upper guiding surface before the lower guiding surface engages the male coupling tongue to force the male coupling tongue to resiliently deflect, upon insertion of the male coupling tongue, the male coupling tongue extends from the base surface of the second furniture part, the base surface extending perpendicular to a longitudinal direction of the male coupling tongue, a length D extends from the base surface to said edge, wherein the lateral locking surface is angled from the female coupling recess direction of the female coupling recess at an upper edge, a length C extends from the base surface to said upper edge, wherein D is less than C.

9. The joining system according to claim 8, wherein, when the first locking element comes to rest at the edge of the upper guiding surface, the length C is less than the length F of the male coupling tongue along a longitudinal direction thereof.

10. The joining system according to claim 1, wherein the length of the male coupling tongue along a longitudinal direction thereof is less than a depth of the female coupling recess.

11. The joining system according to claim 1, wherein the first locking element extends such that it comes to rest at an edge of the upper guiding surface before the lower guiding surface engages the male coupling tongue, the female coupling recess is recessed from the base surface of the first furniture part, the base surface extending perpendicular to a female coupling recess direction of the female coupling recess, a length E extends from the base surface to said edge, the male coupling tongue comprises a base portion having a vertical surface, being essentially parallel with a longitudinal direction of the male coupling tongue, facing the second side, wherein the vertical surface transitions to an inclined surface, with respect to the longitudinal direction, at an edge, the male coupling tongue extends from a base surface of the second furniture part, the base surface extending perpendicular to the longitudinal direction, a length K extends from the base surface to the edge, wherein E is less than K.

12. The joining system according to claim 1, the male coupling tongue comprises a base portion having a vertical surface, being essentially parallel with a longitudinal direction of the male coupling tongue, facing the second side, wherein the lateral locking surface, first locking element and the vertical surface locks the male coupling tongue in the horizontal direction, perpendicular to the longitudinal direction.

13. The joining system according to claim 1, the male coupling tongue comprises a base portion having a vertical surface, being essentially parallel with a longitudinal direction of the male coupling tongue, facing the second side, wherein the vertical surface transitions to an inclined surface, with respect to the longitudinal direction, wherein the inclined surface faces an opposite second inclined surface of the female coupling recess in the joined state, the second inclined surface transitions into the lateral locking surface, wherein, in the joined state, the inclined surface and the second inclined surface are separated by a distance.

14. The joining system according to claim 1, wherein the upper guiding surface faces an opposite second surface of the male coupling tongue in the joined state, wherein, in the joined state, the guiding surface and the second surface are separated by a distance d2.

15. The joining system according to claim 1, wherein the male coupling tongue comprises a removable locking element defining an outer contour of the male coupling tongue, wherein the locking element is configured to be arranged within the female coupling recess, whereby the removable locking element comprises said first locking element configured for a snap joint interlocking engagement with said matching second locking element in the female coupling recess.

16. The joining system according to claim 15, wherein the male coupling tongue comprises a core portion positionable inside a cavity of the removable locking element in an interlocking position of respective mating surfaces so that the removable locking element defines said outer contour of the male coupling tongue, wherein the mating surfaces are at least partly symmetrically aligned with respect to a longitudinal direction of the male coupling tongue so that the removable locking element is positionable around the core portion in a first position, in which the first locking element extends in a first radial direction, and in a second direction, in which the first locking element extends in a second radial direction, opposite the first radial direction.

17. The joining system according to claim 15, wherein the removable locking element is generally U-shaped.

18. The joining system according to claim 15, wherein the female coupling recess extends along a length of the first furniture part, the locking element is slidable along said length relative the male coupling tongue, when in said interlocking engagement, to be pushed out from said female coupling recess and detached from the first and second furniture parts, allowing deliberate separation between the first furniture part and the second furniture part when detached.

19. The joining system according to claim 1, wherein the first locking element extends along intermittent lengths of the male coupling tongue along a length of the second furniture part, wherein the intermittent lengths are separated by male decoupling sections, wherein the second locking element extends along intermittent lengths of the female coupling recess along a length of the first furniture part, wherein the intermittent lengths are separated by female decoupling sections, whereby, the first and second furniture parts are slidable relative to each other along said lengths, in said interlocking engagement, to a decoupling state in which the male decoupling sections overlap with the second locking element and the female decoupling sections overlap with the first locking element allowing deliberate separation between the first furniture part and the second furniture part.

20. The joining system according to claim 1, wherein the first and second furniture parts are joined along an inclined corner surface at a corner joint thereof, wherein the first and second furniture parts comprises mutual interlocking surfaces formed as a recess in the second furniture part and a protrusion in the first furniture part, the recess being arranged between the male coupling tongue and a corner edge of the corner joint.

\* \* \* \* \*